United States Patent
Jhingran et al.

(10) Patent No.: US 10,462,138 B2
(45) Date of Patent: Oct. 29, 2019

(54) APPLICATION PROGRAMMING INTERFACE ACCESS CONTROLS

(71) Applicant: Google LLC, Mountain View, CA (US)

(72) Inventors: Anant Deep Jhingran, San Jose, CA (US); Mukundha Madhavan Gnana Sekaran, Fremont, CA (US); Sridhar Rajagopalan, Liverpool (GB)

(73) Assignee: Google LLC, Mountain View, CA (US)

( * ) Notice: Subject to any disclaimer, the term of this patent is extended or adjusted under 35 U.S.C. 154(b) by 102 days.

(21) Appl. No.: 15/432,458

(22) Filed: Feb. 14, 2017

(65) Prior Publication Data

US 2017/0244709 A1 Aug. 24, 2017

Related U.S. Application Data

(60) Provisional application No. 62/297,608, filed on Feb. 19, 2016, provisional application No. 62/297,596, filed on Feb. 19, 2016.

(51) Int. Cl.
*H04L 29/06* (2006.01)
*G06F 21/44* (2013.01)
*G06F 21/62* (2013.01)

(52) U.S. Cl.
CPC .............. *H04L 63/10* (2013.01); *G06F 21/44* (2013.01); *G06F 21/629* (2013.01); *H04L 63/08* (2013.01); *H04L 67/42* (2013.01)

(58) Field of Classification Search
CPC ......... H04L 63/10; H04L 63/08; H04L 67/42; G06F 21/629; G06F 21/44
USPC .......................................................... 726/4
See application file for complete search history.

(56) References Cited

U.S. PATENT DOCUMENTS

| | | | | |
|---|---|---|---|---|
| 8,452,882 | B2* | 5/2013 | Schneider | H04L 63/083 709/229 |
| 9,027,039 | B2* | 5/2015 | Michels | G06F 9/54 719/328 |
| 9,363,267 | B2* | 6/2016 | Sugihara | H04L 63/1466 |
| 9,906,552 | B1* | 2/2018 | Brown | H04L 63/1458 |
| 2004/0128392 | A1* | 7/2004 | Blakley, III | H04L 63/0815 709/229 |
| 2007/0157300 | A1* | 7/2007 | Sivaradjane | H04L 63/1458 726/9 |
| 2014/0259190 | A1* | 9/2014 | Kiang | G06F 21/6218 726/30 |

(Continued)

OTHER PUBLICATIONS

Juels et al. "Client Puzzles: A Cryptographic Countermeasure Against Connection Depletion Attacks," NDSS. vol. 99, 1999, 15 pages.

(Continued)

*Primary Examiner* — Abu S Sholeman
(74) *Attorney, Agent, or Firm* — Fish & Richardson P.C.

(57) ABSTRACT

Methods, systems, and apparatus, including computer programs encoded on computer storage media, for controlling access to APIs. One of the methods includes receiving a request from a client for a computer authorization challenge to access an application programming interface; determining a computer authorization challenge with a difficulty of completion that satisfies a target computational cost for the application programming interface; and providing the computer authorization challenge to the client for access to the application programming interface.

20 Claims, 12 Drawing Sheets

(56) References Cited

U.S. PATENT DOCUMENTS

2015/0163206 A1* 6/2015 McCarthy ........... G06F 21/6227
                                                                                   713/171

OTHER PUBLICATIONS

Jennings. "SIP Computation Puzzles," Cisco Systems, Internet Draft, Jul. 11, 2004, [ retrieved from Internet URL<https://tools.ietf.org/id/draft-jennings-sip-hashcash-00.txt> ] 4 pages.

'wikipedia.com' [online] "Penny Black (research project)," [retrieved on Jan. 26, 2017] Retrieved from Internet: URL<https://en.wikipedia.org/wiki/Penny_Black> 4 pages.

'wikipedia.com' [online] "Hashcash," [Retrieved on Jan. 19, 2016] Retrieved from Internet URL<https://en.wikipedia.org/wiki/Hashcash> 6 pages.

'wikipedia.com' [online] "Cost-based anti-spam systems," [Retrieved on Jan. 19, 2017] Retrieved from Internet URL< https://en.wikipedia.org/wiki/Cost-based_anti-spam_systems> 3 pages.

'wikipedia.com' [online] "Blockchain (database)," [retrieved on Feb. 9, 2017] Retrieved from Internet: URL<https://en.wikipedia.org/wiki/Blockchain_(database)> 16 pages.

\* cited by examiner x = 1010001110110 _ _ _ _ _ _ _

APPLICATION PROGRAMMING INTERFACE ACCESS CONTROLS

CROSS-REFERENCE TO RELATED APPLICATIONS

This application claims the benefit of U.S. Provisional Application No. 62/297,596, filed Feb. 19, 2016, and U.S. Provisional Application No. 62/297,608, filed Feb. 19, 2016, both of which are incorporated herein by reference.

BACKGROUND

Some systems may use an application programming interface (API) to allow access to data managed by the system. The system may provide one or more API function calls that are each specific to particular data, a particular type of data, or both. A remote system may use the API function calls to manipulate or request access to the data.

SUMMARY

An application programming interface (API) service platform may control access to API function calls. In response to receipt of a request for access to an API, e.g., a request that identifies an API function call, the API service platform determines a computer authorization challenge and provides the computer authorization challenge to a requesting device.

The API service platform selects the computer authorization challenge such that a cost, e.g., computational cost, for the requesting device to determine a response to the computer authorization challenge is greater than a potential benefit for a malicious system. The API service platform may select a computer authorization challenge with a cost for determining a response that is less than a potential benefit for an honest, e.g., non-malicious, system.

The requesting device may determine a response to the computer authorization challenge. In some examples, the requesting device may provide the computer authorization challenge to another system, e.g., as part of a service, to determine the response to the computer authorization challenge. The requesting device may receive the response from the other system. The requesting device provides the response to the API service platform.

The API service platform determines whether the response matches an expected response for the computer authorization challenge. When the response matches the expected response for the computer authorization challenge, the API service platform allows the request for access to the API to be serviced. When the response does not match the expected response for the computer authorization challenge, the API service platform prevents access to the API.

The subject matter described in this specification can be implemented in particular embodiments and may result in one or more of the following advantages. In some implementations, an application programming interface (API) service platform that provides computer authorization challenges before allowing access to an API may reduce a number of malicious calls successfully made to an API provider, reduce computer resources necessary to service calls, e.g., malicious calls, reduce a likelihood that a malicious call is successful, or a combination of two or more of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Various embodiments of the invention are disclosed in the following detailed description and the accompanying drawings.

FIGS. 7A and 7B show two examples of information provided with computer authorization challenges that are associated with different target computational costs.

DETAILED DESCRIPTION

In some implementations an application programming interface (API) service platform controls access to an API. In various embodiments, as described in this document, a "proof of work" is a type of mechanism in which an API provider receives, from a requestor device of an API function or call, a response to a computer authorization challenge in order to establish the requestor device's credentials. The API service platform may use an identifier of a cost boundary associated with an API to control API function calls that are serviced. In various embodiments, the cost boundary is a point along a scale of different costs and represents a selected cost or difficulty level of work that is required of a requestor (e.g., a client device) before the requestor is granted access to the corresponding API. For example, the API service platform may determine the cost boundary using user input from a user interface presented on an API provider device, automatically, e.g., based on analysis of malicious calls, or a combination of the two. In some embodiments, the cost boundary may be a computer resource amount, a monetary amount, or some other measure of value. The API service platform may determine a target computational cost associated with the API based at least in part on the cost boundary. In some embodiments, the target computational cost represents a cost in computer resources (e.g., electricity, processing, bandwidth, percentage used) that would be expended by a device or a machine in calculating a response to a computer authorization challenge.

In some implementations, the API service platform may receive a request from a requestor for a computer authorization challenge to access the API. The API service platform may determine a computer authorization challenge such that a difficulty of completing the computer authorization challenge corresponds to the selected target computational cost. In various embodiments, the difficulty of completing the computer authorization challenge represents the cost in computer resources (e.g., electricity, processing) that would be expended by the requestor in calculating a response to a computer authorization challenge. The API service platform may provide the generated computer authorization challenge to the requestor.

Figure 1:
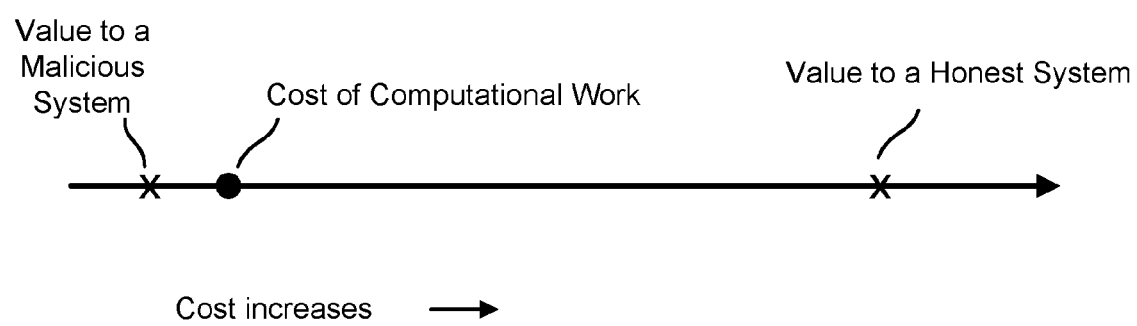
FIG. 1 shows a diagram describing the relative value of access to an API relative to the computational work for a malicious system using the API and for an honest system using the API.

FIG. 1 shows a diagram describing the relative value of access to an API relative to the computational work for a malicious system using the API and for an honest system using the API. An example of a malicious system using an API is an entity that intends to flood the API service with requests so as to cause the request processing entities for the API to be inundated and therefore unable to respond to any requests, such as in a distributed denial-of-service (DDoS) attack. For example, a malicious system may be a computer-implemented bot (e.g., a computer program). A malicious system might not be willing, configured, or both, to expend more than nominal resources for each access to the API since the malicious system does not intend to actually consume the service associated with the API and so expending resources (e.g., more than a nominal cost) does not provide value back to the malicious system. An honest system may be willing, configured, or both, to expend (e.g., more than nominal) resources for each access to the API since the honest system intends to actually consume the service associated with the API and so expending (e.g., more than a nominal cost) provides value to the honest system.

In some embodiments, an API services platform that uses a proof of work mechanism for providing access to an API, determines a tunable cost boundary for an API provider, for example, such that the cost boundary can be set to a point along a cost scale that is beyond a presumed point of value to a malicious system. In some embodiments, an API service platform, which uses a proof of work mechanism for providing access to an API, determines a tunable cost boundary as a point along a cost scale that is beyond a presumed point of value to a malicious system and also at which an API provider conservers resources for each request for the API. The conserved resources may be computation resources, such as processing time, memory, or both, monetary profit, or a combination of two or more of these. In various embodiments, a "tunable" cost boundary may be a point along a cost scale that is adjustable up, down, or both, along the cost scale, as needed by the API provider. Examples of the results of tuning the cost boundary "up" (to a greater cost) and "down" (to a lower cost) will be described in further detail below.

Figure 2:
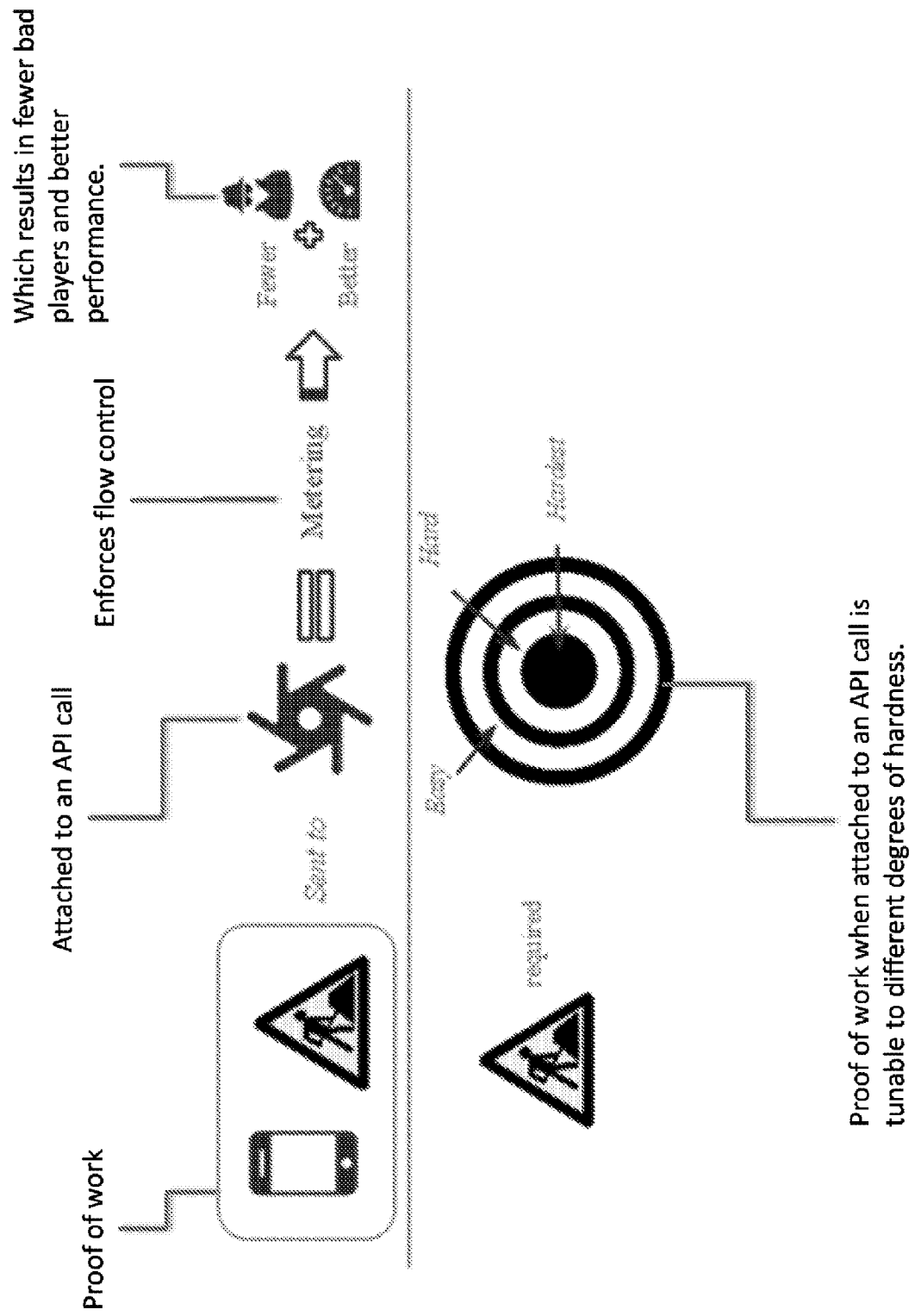
FIG. 2 shows a diagram describing some advantages of an API service platform that uses a proof of work mechanism to permit access to APIs.

FIG. 2 shows a diagram describing some advantages of an API service platform that uses a proof of work mechanism to permit access to APIs. As shown in the diagram of FIG. 2, a proof of work challenge, which is also sometimes referred to as "computer authorization challenge" herein, may be attached to an API function call (e.g., sent to a requesting system in response to a request for the API) to ensure fewer malicious systems access APIs of an API provider, to improve performance for the API provider, or both. In some implementations, the computer authorization challenge attached to an API function call may have a tunable level of difficulty.

By imposing a computational challenge whose cost is greater than the value of the API function call to a malicious system, e.g., a computer-implemented bot, but less than the value to an honest system, the API service platform increase a likelihood that API function calls or requests which are serviced come from honest systems.

Figure 3:
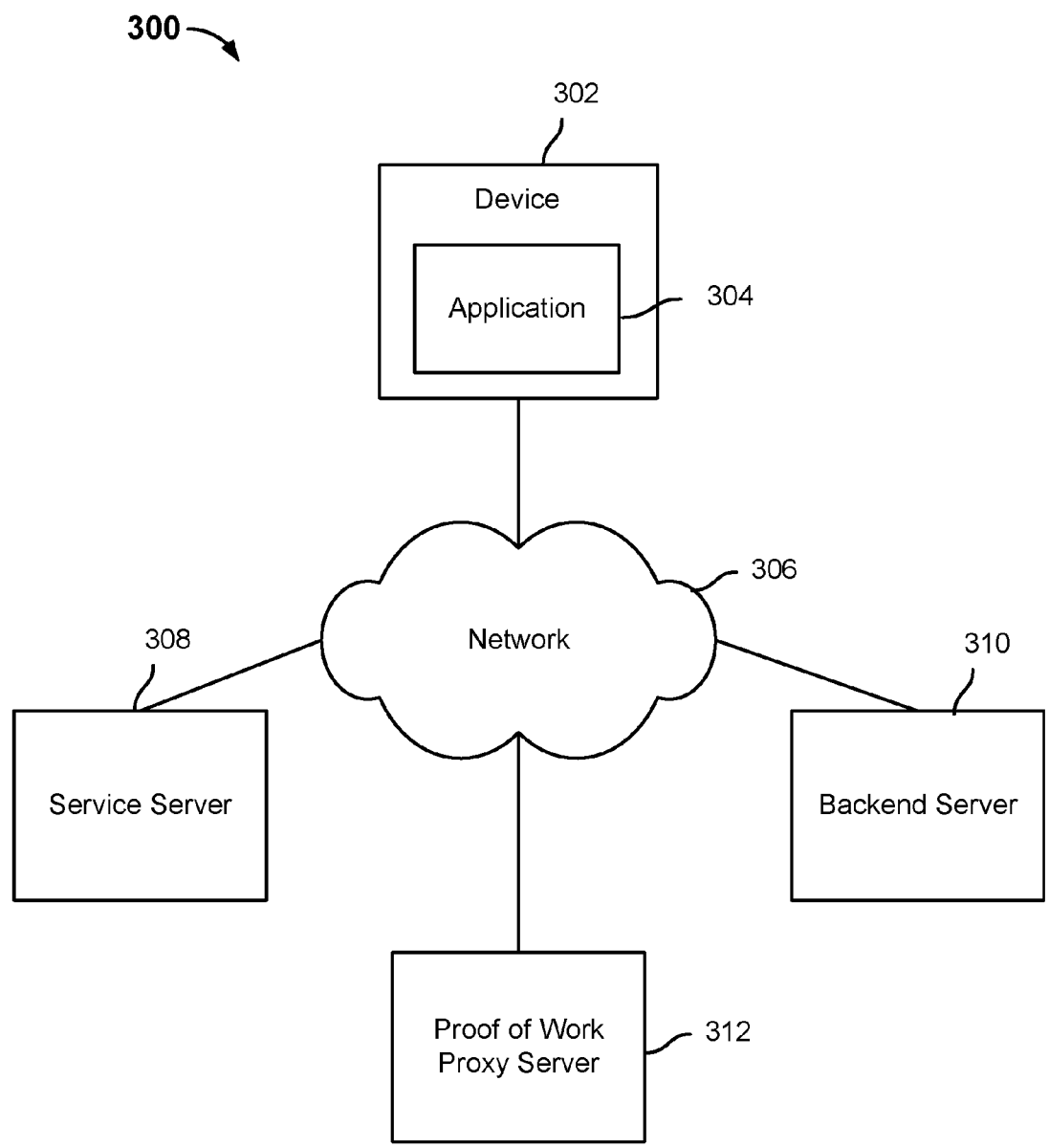
FIG. 3 is a diagram showing an embodiment of a system that uses a proof of work mechanism to permit access to APIs.

FIG. 3 is a diagram showing an embodiment of a system that uses a proof of work mechanism to permit access to APIs. In the example shown in FIG. 3, system 300 includes device 302, network 306, service server 308, backend server 310, and proof of work proxy server 312. In some implementations, the system 300 may include more or fewer components. In some embodiments, network 306 comprises one or more of high speed data networks and/or telecommunications networks. In some embodiments, each of device 302, service server 308, backend server 310, and proof of work proxy server 312 communicates to one another over network 306.

Any of the components shown in FIG. 3 may represent one or more physical devices. Any of the components shown in FIG. 3 may be integrated together with one or more other components shown in FIG. 3 and/or a component not shown in FIG. 3. Examples of device 302 include a server, a personal computer, a desktop computer, an electronic reader, a laptop computer, a storage, a smartphone, a tablet computer, a mobile device, a wearable device, a wearable computer, and any other computer or electronic device. Examples of network 306 include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 3 may exist in various combinations of hardware machines. Other communication paths may exist and the example of FIG. 3 has been simplified to illustrate the example clearly. Although single instances of components have been shown to simplify the diagram, additional instances of any of the components shown in FIG. 3 may exist. Components not shown in FIG. 3 may also exist to perform and provide functions and services described in this document.

An API provider may want to make their backend services available online for consumption by applications running on computers such as mobile devices and desktops. For example, an organization might want to expose its services, as a set of web endpoints, that provide product pricing and availability information, sales and ordering services, order tracking services, and any other services required by client applications executing on requestor devices or systems. Client application developers may then make web requests to these endpoints in developed application code to use the functionality of the organization's services. The client applications that consume these services can be implemented as standalone applications for a computer, such as a mobile device or tablet, as web applications running in a browser, or as any other type of application that can make a request to a web endpoint and consume any response data. These applications might be developed and released by the same organization that exposed the services or by third-party application developers who make use of publicly available services.

Developers may face challenges when trying to consume services from different providers. The same client application might have to use one mechanism to consume a service from one provider, and a different mechanism to consume a service from a different provider. The services from the different providers may be the same or similar services or different services.

Developers must ensure that they have taken all necessary steps to secure and protect their services from unauthorized access. After a client application that accesses services has been released, a service provider is then required to make sure that those services continue to function over time as they add, modify, or delete those services. The service provider sometimes may provide a way to keep developers aware of any changes to the services to ensure that client applications stay in sync with those services.

In some embodiments, an API service platform, that includes service server 308, proof of work proxy server 312, or both, enables secure access to a backend service (e.g., provided by backend server 310) via an API (e.g., well-defined API that is consistent across services, regardless of service implementation) hosted by the API service platform. For example, rather than having a client application (e.g., application 304) access the backend service directly, the API service platform provides access for the client application to various services and maps a publicly available web endpoint via an API to the backend services provided by the backend server 310. The backend service may include services provided by any service provider, content repository of an organization, or both. In some embodiments, the API service platform acts as a proxy for content and/or a server provided by the backend service.

In some embodiments, a developer of application 304 provides application code that will implement functionality of an API provided by the API service platform to access services of the backend service provided by the backend server 310. For example, application 304 interacts with application code provided by a developer (e.g., API implementing code provided by the developer) and implemented on the API service platform to access services of the backend service provided by the backend server 310. In some embodiments, the backend service is optional and application code provided by the developer provides functionality without accessing the backend service.

In some embodiments, the developer may program a user application to access services of the API service platform. For example, the developer develops both a user application to be executed by a requestor device and application code executed by the API service platform that interfaces with the user application to provide access to the backend service. The application code (e.g., compiled program, un-compiled program, source code, script, API implementation code, etc.) provided by the developer may be stored by the API service platform.

The API service platform may provide its services using one or more API edge servers, such as service server 308, that each handles API requests. By utilizing a plurality of API edge servers, the API service platform may achieve fault tolerance, load balancing, geographical distribution, or a combination of two or more of these. For example, each request is routed to one of the API edge servers handling requests based on current load of the servers and geographical closeness of the requester to a particular API edge server.

In some embodiments, the API service platform is able to handle the security and authorization tasks required to protect backend services, analyze, track, manage, monitor, or monetize the services, or a combination of two or more of these. Because applications of developers make requests to the API service platform, rather than directly to the backend service provided by the backend server 310, developers do not need to know the implementation detail of the backend service. Thus the API service platform may allow isolation of developers from backend services. In some embodiments, policies on the API service platform are utilized to add functionality to a service without having to make any changes to the backend service. For example, policies may be added to perform data transformations and filtering, add security, execute conditional logic or custom code, and to perform many other actions. In another example, access may be revoked, modified, or both, so that a particular user application no longer has full access to the backend services. In another example, policies may be implemented to limit, track, and manage access to services. For example, an API product may be limited by a maximum limit on the number of requests allowed. In some examples, an API product may be made available with a low access limit, such as one thousand requests per day, for a low price, while another API product provides access to the same API services, but with a much higher access limit, for a higher price.

In some embodiments, the API service platform provides tools for adding and configuring APIs, applications, and related policies. In some embodiments, the API service platform is deployed within the computing environment of the backend service. In some embodiments, the API service platform is deployed in the cloud (SaaS) where multiple entities may share the API service platform. The service server 308, the proof of work proxy server 312, the backend server 310, or a combination of two or more of these, may each be an example of a system implemented as computer programs on one or more computers in one or more locations, in which the systems, components, and techniques described below are implemented. The service server 308, the proof of work proxy server 312, the backend server 310, or a combination of two or more of these, may each use a single server computer or multiple server computers operating in conjunction with one another, including, for example, a set of remote computers deployed as a cloud computing service.

In some embodiments, the API service platform provides API analytics, and developer services. These services together may provide a comprehensive infrastructure for API creation, security, management, and operations, as well as backend services for developing client applications. In some embodiments, API services provide API creation and utilization services. For example, tools for adding and configuring APIs, setting up API products, and managing application developers and client applications are provided. Policies may be implemented to add security, rate-limiting, mediation, caching, etc. Behaviors may be customized by applying custom scripts, making calls out to third-party APIs and services, etc. In some examples, a flexible data store and features such as social graphs, geolocation, user management, push notifications, performance monitoring, etc. are provided. In some embodiments, Java node.js may be implemented to create APIs and API mashups. In some embodiments, analytics services provide powerful tools to analyze short-term and long-term usage trends of APIs. For example, audiences may be segmented by top developers and applications to understand usage by API methods to know where to invest, and create custom reports on business-level or operational-level information. In some embodiments, as data passes through the API service platform, several types of information are collected including URL, IP, user ID for API function call information, latency, error data, etc. Policies may be created to add other information, such as headers, query parameters, and portions of a request or response extracted from XML or JSON. In some embodiments, the information is collected asynchronously from the actual request and/or response flow and does not affect API performance. In some embodiments, developer services provide the tools to manage the community of application developers using such services. Developer services may offer the flexibility to work with internal and external developers and formalize these relationships with financial models. In some embodiments, developer services are utilized to onboard developers and create a developer portal for publicly available API products. Application developers may connect to the portal to access API documentation, forums, blog entries, etc. In some embodiments, monetization capabilities provide the financial infrastructure and relationships for digital assets. Monetization may allow a variety of rate plans that charge for the use of API products or through revenue-sharing. Monetization plans may include pre-paid plans, post-paid plans, fixed-fee plans, variable rate plans, "freemium" plans, etc. In some embodiments, the API service platform provides monetization reporting and billing services.

In some embodiments, a code repository included in the API service platform stores program code to be executed and/or implemented by the API service platform. For example, one or more developers provide application code (e.g., code implementing one or more APIs) to be executed by the API service platform. In some embodiments, application code provided by a device used by the developer, stored in the code repository, and/or executed by the API service platform may access third-party services provided by a third-party service. For example, content is obtained from the third-party service that is controlled by an entity external to an entity of the backend service, the API service platform, and a device associated with a user. In some embodiments, each API request to the API service platform includes an API key that verifies access to the services of the API service platform. The API key may be revoked and/or limited (e.g., limited in time, limited in count, limited in manner associated with a quota, etc.) dynamically.

Service server 308 is configured to provide a user interface for receiving a cost boundary associated with permitting access to a corresponding API. In some embodiments, the user interface is included in a web page accessible using a uniform resource locator. The user interface may include an input area (e.g., an input field, an input window) and/or a visual scale (e.g., a line or series of discrete points that illustrate a range of different costs) that allows user input of the cost boundary. In some examples, a provider (e.g., the party that operates backend server 310) of an API (e.g., for accessing a service and/or data provided by backend server 310), may input a cost boundary via the user interface, where the cost boundary indicates a value (e.g., a resource value, a monetary value or some other measure of value) that is required of a requestor for accessing an API. For example, user input of the cost boundary may comprise one or more input characters and/or a selection along a visual scale.

In some embodiments, the cost boundary comprises a desired maximum boundary and/or cost associated with a request for an API. For example, the cost boundary may be selected to be a lower value (greater than zero) as a technique to deter malicious requestors of the API (as it is assumed that malicious requestors are less willing to pay costs in mounting an attack). The cost boundary may be selected to be higher value (greater than zero and greater than a nominal value that is intended to primarily deter malicious requestors) as a technique to monetize the service provided by the API, as will be described in further detail below. In various embodiments, the API service platform, e.g., the service server 308, may receive different identifiers associated with different cost boundaries for the same API. The API service platform may use the different identifiers to adjust the cost boundary associated with that API over time.

In some implementations, the service server 308 may automatically determine the cost boundary, e.g., without receiving user input specifying the cost boundary. For instance, the service server 308 may use data for the API, for another API, or both to determine the cost boundary. The data for the API, the other API, or both, may indicate a frequency with which the API is accessed, a frequency of a particular type of requests, e.g., malicious requests, a cost boundary, or a combination of two or more of these. The service server 308 may use data for another API, e.g., representing a number of malicious requests and a cost boundary for the other API, when determining an initial cost boundary for the API.

In response to receiving the cost boundary, service server 308 is configured to select a target computational cost based at least in part on the cost boundary. In various embodiments, the target computational cost comprises the cost of computer resources that are predicted to be expended by a computer in computing a response to a proof of work-based computer authorization challenge. In various embodiments, the proof of work-based computer authorization challenge comprises a cryptographic challenge. Examples of computer resources include electricity consumed, memory used, and processing time. In some embodiments, the monetary value associated with the target computational cost may be set to be less than, equal to, or greater than the monetary value associated with the received cost boundary. For example, if the cost boundary were associated with the monetary value of $10, then the monetary value associated with the target computational cost may be set at $11.

Devices such as device 302 are configured to run user applications such as application 304. For example, device 302 comprises a smartphone, a tablet device, a desktop computer, a laptop computer, or any computing device. A user operation performed at application 304 may cause an API request for a particular API service to be generated by application 304 and sent to an edge server in the API service platform such as the service server 308. For example, the API request may request a service to provide backend data (e.g., data stored in a database managed by backend server 310) that is accessible to an edge server such as service server 308. The service provided by the edge server such as service server 308 in response to an API request may be to return a piece of multimedia content (e.g., video content) and/or web page data. In some embodiments, an application such as application 304 or the API service platform may select an API request recipient edge server (e.g., service server 308) based on criteria such as a location of device 302, a location of the edge server, a service provided by the edge server, and the available processing capacity of the edge server.

Service server 308 is configured to receive a request to access an API from an application executing at a device (e.g., application 304 executing at device 302). The request to access an API may comprise a call for a particular function associated with an API. Service server 308 is configured to dynamically generate a computer authorization challenge or search among previously generated computer authorization challenges for a computer authorization challenge for which the difficulty of generating the corresponding response corresponds to the selected target computational cost associated with the API. In various embodiments, a computer authorization challenge comprises a proof of work challenge, which is a challenge that requires the challenge recipient to produce the correct response (e.g., a proof of work certificate) to the challenge through a period of computing (e.g., exhaustive or brute force searching for the correct solution to the problem in the challenge). In some embodiments, a response to a computer authorization challenge is sometimes referred to as a "proof of work certificate." In various embodiments, the difficulty of generating the corresponding response corresponds to a predicted cost to be expended by a requestor in computing the correct response to the computer authorization challenge. For example, the service server 308 determines a computer authorization challenge that has an expected difficulty of generating the corresponding response that is the same as or within a tolerance of the selected target computational cost associated with the API. The service server 308 may select the computer authorization challenge for a particular API function call, all API function calls for the backend server 310 (e.g., an API itself), all API function calls associated with a particular entity, e.g., website or organization, or a combination of two or more of these. In some examples, the service server 308 may have a different computer authorization challenge for different API function calls. The service server 308 may be configured to generate and store the response to the selected computer authorization challenge.

Service server 308 is configured to send the generated or selected computer authorization challenge to the requestor (e.g., application 304). Service server 308 may be configured to not service the API request until service server 308 receives a correct response to the computer authorization challenge from the requestor. In some embodiments, in the event that service server 308 does not receive a correct response to the computer authorization challenge from the requestor within a predetermined period of time, service server 308 may be configured to deny servicing the API request from the requestor. In some embodiments, in the event that service server 308 does receive a correct response to the computer authorization challenge from the requestor within a predetermined period of time, service server 308 may be configured to service the API request. For example, servicing the API request may include retrieving requested data from a (e.g., local) cache storage, forward the API request to a backend server (e.g., backend server 310) for the backend server to provide the requested data, and/or generate and send to third party server a service request based on the API request.

In some implementations, systems such as mobile devices, for example, which have limited computation power, might not be able to efficiently produce responses to computer authorization challenges (e.g., proof of work certificates). In some examples, these types of systems which cannot efficiently produce response to computer authorization challenges may send a request to a service with adequate computational power to produce the response (e.g., perform this work) on the system's behalf. These systems may send the request to the service based on data that indicates user input that the service should be contacted when the system, e.g., mobile device or any other device that is associated with limited computation power, is faced with a request to provide a response to a computer authorization challenge (e.g., a proof of work challenge). The proof of work proxy server 312 may implement the service.

In some embodiments, service server 308 is configured to send the generated responses for one or more computer authorization challenges to proof of work proxy server 312. In some embodiments, service server 308 is configured to generate a batch of computer authorization challenges and corresponding responses prior to runtime and send the batch of computer authorization challenges and corresponding responses to proof of work proxy server 312. Proof of work proxy server 312 is then configured to store the received batch of computer authorization challenges and corresponding responses. At runtime, during which API requests are received at service server 308, a requestor such as application 304 that receives a computer authorization challenge from service server 308 may be configured to forward the computer authorization challenge to proof of work proxy server 312, e.g., based on settings for the application 304. The requestor may be configured to authorize a monetary payment (or an indication to debit a particular amount from an account previously set up at proof of work proxy server 312) associated with the computer authorization challenge such that in return for the monetary payment and the computer authorization challenge, proof of work proxy server 312 is configured to return the correct response to the computer authorization challenge to the requestor. In some embodiments, identification of a monetary value that is needed to purchase the correct response to a computer authorization challenge is sent with the computer authorization challenge from service server 308. In various embodiments, the monetary value that is needed to purchase the response the computer authorization challenge is equal to or otherwise determined based on the cost boundary received for the API all requested by the requestor. The requestor may be configured to send the received response to the computer authorization challenge back to service server 308.

In some embodiments, at least a portion of the monetary value associated with purchasing the correct response to a computer authorization challenge for a request for an API that is collected by proof of work proxy server 312 may be returned to a provider of the API. In some embodiments, the portion of the monetary value associated with purchasing the correct response to a computer authorization challenge for a request for an API that is collected by proof of work proxy server 312 and returned to a provider of the API may be determined based on an established rule between the party operating proof of work proxy server 312 (and also service server 308) and the party that provides the API (e.g., a party that operates a backend server).

In some embodiments, proof of work proxy server 312 and service server 308 are implemented as one physical server, or set of servers that together implement both components, and not as separate servers as they are shown in the example of FIG. 3.

By providing a monetary payment in lieu of computing the response to a computer authorization challenge, the requestor may be spared the expenditure of resources on the local device and/or is given the option to obtain the response even if though the local device may not be equipped to compute the response to the computer authorization challenge.

By requiring a response to a proof of work-based computer authorization challenge before allowing access to an API provides the API provider the opportunity to deter malicious attackers and/or monetize access to the API, without the inefficiencies and labor associated with maintaining and verifying user credentials (e.g., storing and managing retrieval of user logins and passwords). In some examples, even if a malicious party hacks and gains control of application 304 from which API requests originates, access to APIs may be protected by the proof of work-based computer authorization challenges regardless of which party is operating application 304. For example, conventionally, if a malicious party has obtained a user's login name and password associated with an application, the malicious party may use such credentials to use the application 304 and access an associated API. However, if a proof of work-based computer authorization challenge as described herein is used instead of or in addition to the user login name and password type of credentials, then a malicious party that has gained control of another user's application is still not able to access the associated API unless the malicious party is able to provide a response to an issued computer authorization challenge.

Figure 4:
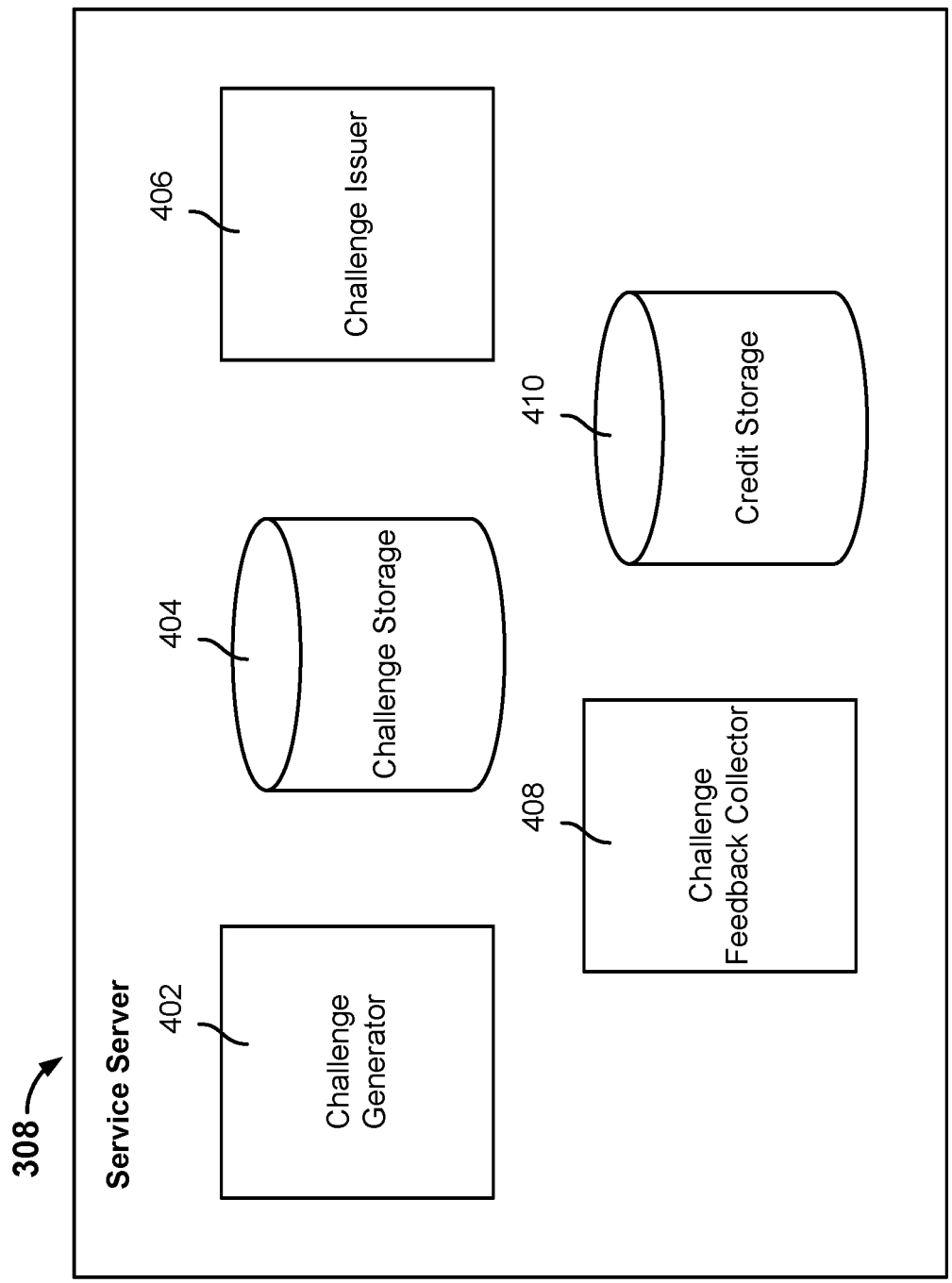
FIG. 4 is a diagram showing an example of a service server.

FIG. 4 is a diagram showing an example of a service server. In some embodiments, service server 308 of system 300 of FIG. 3 may be implemented with the example service server described in FIG. 4. The example service server of FIG. 4 includes challenge generator 402, challenge storage 404, challenge issuer 406, challenge feedback collector 408, and credit storage 410. Each of challenge generator 402, challenge issuer 406, and challenge feedback collector 408 may be implemented using one or more of hardware or software.

Challenge generator 402 is configured to receive an identifier associated with a cost boundary to be assigned to an API. In some embodiments, challenge generator 402 is configured to generate data for a user interface that will receive user input of an identifier (e.g., a user selection) associated with a cost boundary. For example, the identifier associated with the cost boundary may include one or more input characters or data representing a user selection along a scale of various costs. In various embodiments, the identifier associated with the cost boundary may represent a monetary value or another measure of value. Challenge generator 402 is configured to determine a target computational cost associated with the cost boundary. The target computation cost may be set to be less than, equal to, or greater than the cost boundary, depending on user configured rules. Challenge generator 402 is configured to generate and store multiple unique computer authorization challenges and responses corresponding to each target computational cost in challenge storage 404. In various embodiments, a computer authorization challenge comprises a proof of work challenge.

In some embodiments, the proof of work challenge is based on a collision resistant, hard to invert hash function. In some implementations, a hash function $h(x) \rightarrow y$ may be collision resistant if it is computationally expensive to find $x_1$ and $x_2$ such that they hash to the same y. The hash function may be hard to invert if given h(x) (e.g., y) for a randomly chosen x, finding x is a computationally expensive problem. One example has function is SHA-256.

In some examples, a proof of work is a challenge response protocol based on any mutually agreed collision resistant, hard to invert hash function h where the challenger provides the responder device with a pair of strings x, y and asks the responder to provide back a pair of strings u, v such that $h(x \cdot u) = y \cdot v$. Because of the properties of such a hash function, it may be difficult for the responder device to find such a pair unless the responder device exhaustively searches through a large collection of candidates. However, the challenger can easily verify that the responder device has found a satisfying pair by directly evaluating the hash function once and/or comparing the pair returned by the responder to a stored pair. In this example, the length of the string y may be a measure of the difficulty of generating the proof of work and therefore the greater the target computational cost that is associated with the challenge. Specifically, the longer string y is, the harder it is for the responder to find a satisfying pair u, v.

The challenge generator 402 may receive identifiers associated with different cost boundaries for the same API over time, as the cost boundary for a given API is tunable, e.g., can be adjusted. Tuning the cost boundary associated with an API may cause computer authorization challenges of varying target computational costs to be issued to requestors of calls for the API. As such, as the cost boundary is tuned to be higher, the target computational cost is correspondingly increased, and the difficulty and/or computational cost of finding the correct response to the proof work challenge may increase (e.g., as the length of the string y increases). As the cost boundary is tuned to be lower, the target computational cost is correspondingly decreased, and the difficulty and/or computational cost of finding the correct response to the proof work challenge may decrease (e.g., as the length of the string y decreases).

In some embodiments, challenge generator 402 is configured to send at least some computer authorization challenges and responses corresponding to each of various target computational costs to a separate server, such as a proof of work proxy server for the proof of work proxy server to store. That way, the proof of work proxy server can send a response to a computer authorization challenge forwarded to it by an API requestor in exchange for a debit of credit and/or other form of payment. In some embodiments, challenge generator 402 is configured to send an identifier associated with a value (e.g., a monetary amount) that an API requestor may pay to the proof of work proxy server in exchange for the response to a corresponding computer authorization challenge, such that a user of the requesting device may opt to pay the proof of work proxy server for the response rather than cause the requesting device to perform the work required by the challenge to produce the response. For instance, the requesting device may not have the computational resources to perform the work and/or resources required to perform the work required by the challenge. If the requesting device were to work on the challenge, the requesting device may be unavailable for other uses by the user for some period of time. In some embodiments, the monetary value associated with purchasing a response to a computer authorization challenge may be less than a projected monetary value of the target computational cost such that users of API requesting devices would be incentivized to pay for the response rather than allow the requesting device to expend the greater amount of computer resources needed to perform the work for a computer authorization challenge.

Challenge generator 402 is configured to receive feedback with respect to computer authorization challenges associated with various target computational costs over time and potentially modify the computer authorization challenges generated for a target computational cost based on the received feedback. If more than a threshold number of correct responses that are returned for computer authorization challenges associated with a particular target computational cost, the API provider continues to receive malicious API function calls, or both, the service server may adjust the target computational cost for the API provider and subsequent computer authorization challenges generated for that target computational cost to be more difficult and/or computationally expensive. If more than a threshold number of correct responses that are returned for computer authorization challenges associated with a particular target computational cost, the service server may adjust the target computational cost for the corresponding API provider and subsequent computer authorization challenges generated for that same target computational cost to be more difficult and/or computationally expensive. For example, if more than a threshold number of correct responses that are returned for computer authorization challenges associated with a particular target computational cost are not purchased from the proof of work proxy server, then it may be inferred that the computer resources required to perform the work for these computer authorization challenges costs less (e.g., as computing devices become more powerful over time) than their corresponding target computational cost and that subsequent computer authorization challenges generated for that same target computational cost should be generated to be more difficult and/or computationally expensive.

Challenge issuer 406 is configured to receive a request for access to an API from a client, e.g., a requesting device. In various embodiments, the client comprises a software application executing on a device. For example, the request for access to an API may include identifying information associated with a call to a specific function associated with an identified API. In response to receiving the API request, challenge issuer 406 is configured to send a proof of work-based computer authorization challenge to the requestor.

In some implementations, challenge issuer 406 may be configured to cause challenge generator 402 to dynamically generate a new computer authorization challenge corresponding to the target computational cost for the requested API. The challenge generator 402 or the challenge issuer 406 may determine the target computational cost for the requested API and provide the target computational cost to the challenge generator 402 for use generating the new computer authorization challenge.

In some embodiments, challenge issuer 406 is configured to select an unused computer authorization challenge corresponding to the target computational cost. The unused computer authorization challenge may have been determined for the requested API. The challenge generator 402 may have generated the unused computer authorization challenge and stored at challenge storage 404. After challenge issuer 406 sends a previously unused computer authorization challenge that was stored at challenge storage 404 to the requestor, challenge issuer 406 may be configured to mark the computer authorization challenge as used so that challenge issuer 406 does not issue the same challenge again to the same requestor, to a different requestor, or both.

Challenge issuer 406 is configured to determine whether a correct response to the issued computer authorization challenge is received for the requestor within a predetermined period of time. Once a response to the issued computer authorization challenge is received from the requestor or the proof of work server, challenge issuer 406 is configured to determine whether the response is correct. For example, challenge issuer 406 is configured to determine whether the response is correct by either comparing the response to the correct response stored at challenge storage 404 or by inputting the received response value(s) into a function used to verify that the response is correct. In the event that the correct response to the issued computer authorization challenge is received for the requestor within the predetermined period of time, challenge issuer 406 is configured to service the request for the API. For example, servicing the API request may include retrieving requested data from a cache storage based on the API, forward the API request to a backend server for the backend server to provide the requested data that is responsive to the API, and/or generate and send to third party server a service request based on the API identified in the request. In the event that the correct response to the issued computer authorization challenge is not received for the requestor within the predetermined period of time, challenge issuer 406 is configured to deny service for the request for the API. The challenge issuer may send a message to the requestor indicating that the request has been denied because the response to the computer authorization challenge was incorrect or not received.

Challenge feedback collector 408 is configured to collect feedback on how requestors, e.g., clients, have responded to issued computer authorization challenges. In various embodiments, challenge feedback collector 408 is configured to determine whether a correct response that is received from a requestor for an API is a response received on behalf of the requestor from a proof of work proxy server (e.g., proof of work proxy server 312 of system 300 of FIG. 3) or some other server that is configured to provide responses to the computer authorization challenges by determining whether the correct response corresponds to a response that was indicated by the proof of work proxy server (or other server) as being one that was provided on behalf of a requestor. For example, a received correct response that is determined to not have been requested from the proof of work proxy server may be inferred as a response computed by the requesting device. In the event that challenge feedback collector 408 determines that at least a predetermined number of responses corresponding to issued computer authorization challenges associated with a particular target computational cost were not generated by the proof of work proxy server, challenge feedback collector 408 may send an indication to challenge generator 402 to indicate that the degree of difficulty associated with subsequently generated computer authorization challenges associated with that particular target computational cost should be recalibrated, e.g., increased. For example, challenge generator 402 may be configured to increase the difficulty of subsequently generated computer authorization challenges associated with that particular target computational cost so as to incentivize users that want to request access to APIs associated with that target computational cost to request responses from the proof of work proxy server instead of using their requesting devices to compute the responses.

Credit storage 410 may be configured to store user account data associated with API access. The data for each user account may include credits that a user may apply towards purchases of computer authorization challenge responses. For example, a user may add more credits into his or her account via a webpage or application debiting from a credit card and/or transferring funds from a bank or other type of account. After a user submits an indication via a device to purchase a computer authorization challenge response in exchange for access to an API, the monetary value associated with the cost boundary for the requested API is debited from that user's account. In some embodiments, credit storage 410 is maintained at a different server, such as the proof of work proxy server that is configured to primarily sell responses to computer authorization challenge or another server. By establishing a credit system via the service server, money or other types of credits may be collected from API requestors (and shared with API providers), without the need for each API provider to establish its own payment system. Furthermore, the credit system via the service server may obviate any need for a traditional authentication system that requires the storage and maintenance of user logins and passwords.

Figure 5:
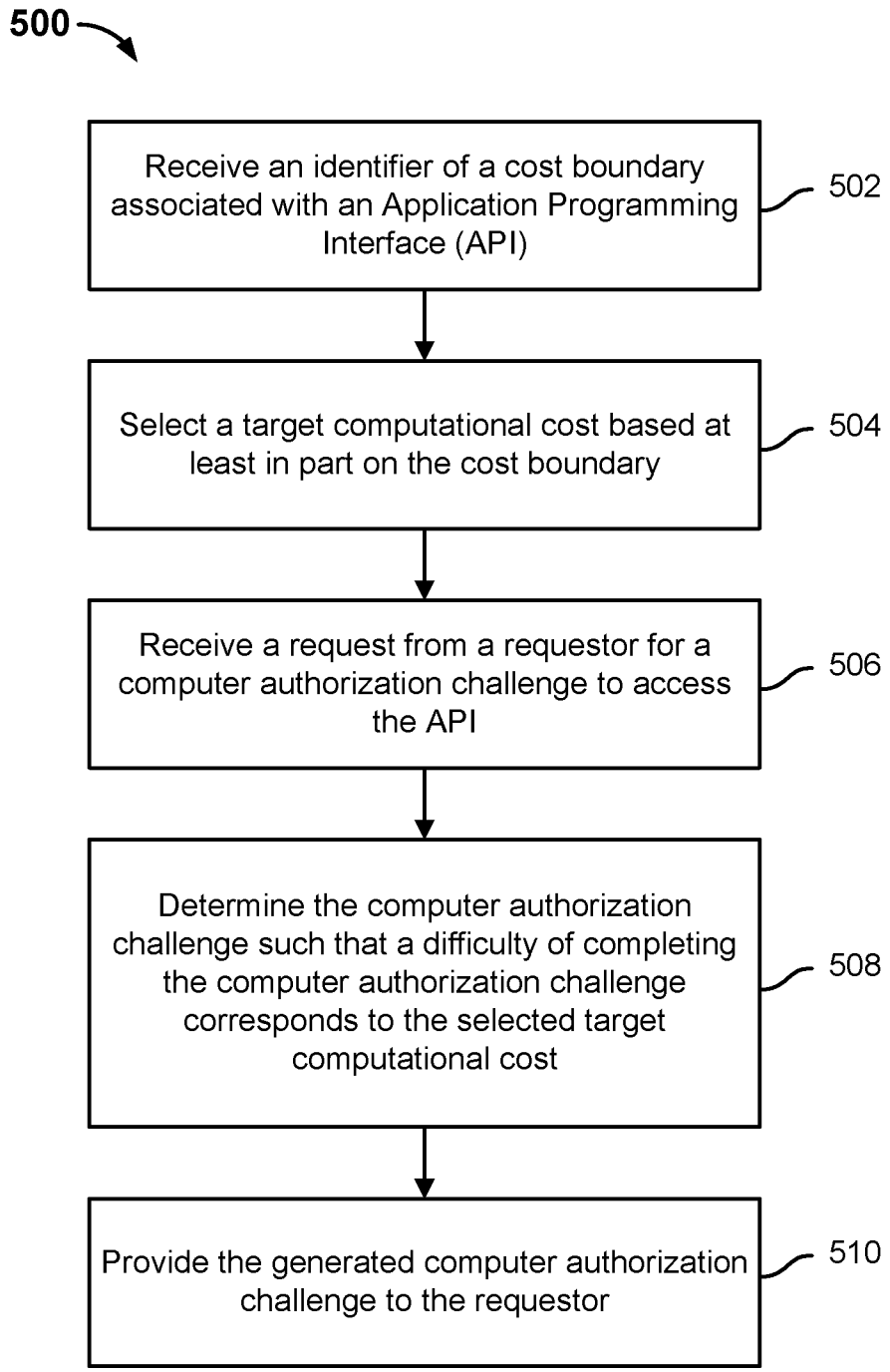
FIG. 5 is a flow diagram showing an embodiment of a process for using a proof of work mechanism to permit access to APIs.

FIG. 5 is a flow diagram showing an embodiment of a process for using a proof of work mechanism to permit access to APIs. In some embodiments, process 500 may be implemented on a system such as system 300 of FIG. 3. Specifically, in some embodiments, process 500 may be implemented on a service server 308 of FIG. 3.

At 502, an identifier of a cost boundary associated with an application programming interface (API) is received. In various embodiments, the identifier of the cost boundary is a user input that identifies the cost boundary. For example, the user input comprises one or more input characters or a selection along a scale of varying costs. In various embodiments, the cost boundary comprises a monetary value, comprises an amount of computer resources, represents an amount of computer resources, or a combination of two or more of these. In some embodiments, the identifier of the cost boundary is received from a device or a server associated with a provider of the API.

At 504, a target computational cost based at least in part on the cost boundary is selected. As described above, in various embodiments, the target computational cost represents a cost in computer resources (e.g., electricity, processing power) that would be expended by a device or a machine in calculating a response to a computer authorization challenge. In some embodiments, the target computational cost is determined based on the predicted expenditure of computer resources by a computer. In some embodiments, the monetary value associated with the target computational cost may be determined to be less than, equal to, or greater than the monetary value associated with the cost boundary, depending on a rule (e.g., configured by the API platform associated with the service server and/or a provider of the API). For example, the cost boundary may be selected to be $10 and the target computational cost may be determined to be $9, $10, or $11.

In some implementations, the service server may select a target computational cost as a value that is as close to the cost boundary as possible. The service server may select the target computational cost as a value that does not exceed the cost boundary. The service server may select the target computational cost as a value that exceeds the cost boundary.

In some examples, the service server may include a mapping of computer resource costs to cost boundary values for different computer authorization challenges. For instance, the mapping may include an entry for different target computational costs of one, five, ten, twenty, thirty, and so on. For each entry in the mapping, the mapping may indicate the respective computer resource cost that corresponds with the respective value, a type of computer authorization challenge that corresponds with the respective value, or both. When the service server determines that a cost boundary for an API is seven, the service server uses the mapping to determine one or more target computational costs, for the API. For example, the service server determines to use three target computational costs for the API: a five value target computational cost and two one value target computational costs.

The service server may use these three target computational costs to determine three corresponding computer authorization challenges in response to receiving a request to access the API. The service server may determine the computer authorization challenges using the computer resource cost indicated in the entry for the target computational cost. For instance, the service server may include another mapping that indicates multiple computer authorization challenges for each target computational cost and may select one computer authorization challenge with a value of five and two computer authorization challenges, each with a value of one. In some examples, the service server may generate one or more of the computer authorization challenges on the fly using the target computational cost.

When the service server does not have a combination of target computational costs that can be combined to equal the cost boundary, the service server determines a combination that is close to the cost boundary. For instance, with target computational cost values of three, five, and ten, and a cost boundary of seven, the service server may select a total target computational cost of five or eight. The service server may select a total target computational cost of eight when selecting a target computational cost that is closest to the cost boundary or greater than the cost boundary. The service server may select a total target computational cost of five when selecting a target computational cost that is less than the cost boundary.

At 506, a request from a requestor for a computer authorization challenge to access the API is received. In some embodiments, a request for a computer authorization challenge to access the API comprises a request to call a specific function associated with the API. In some embodiments, a request for a computer authorization challenge to access the API comprises a request to call multiple functions associated with the API. In some embodiments, a request for a computer authorization challenge to access the API comprises a request to call any function associated with the API, e.g., and does not specify a particular function call. In various embodiments, the requestor from which the request originates comprises a software application executing at a device. In some embodiments, the request is generated by the requestor in response to a user selection or operation within the requestor. For example, the request is generated in response to a user selection of a presented button for obtaining webpage content.

At 508, the computer authorization challenge is determined such that a difficulty of completing the computer authorization challenge corresponds to the selected target computational cost. A difficulty of completing a proof of work-based computer authorization challenge may correspond to an expenditure of computer resources that is predicted to be required to produce the response to the challenge. In various embodiments, the determined computer authorization challenge for which the difficulty of generating the response corresponds to the selected target computational cost of the API is determined. For example, if the target computational cost is selected to be $10, then a computer authorization challenge for which the difficulty of computing the response is $10 (or within a given tolerance) is generated.

Figure 6:
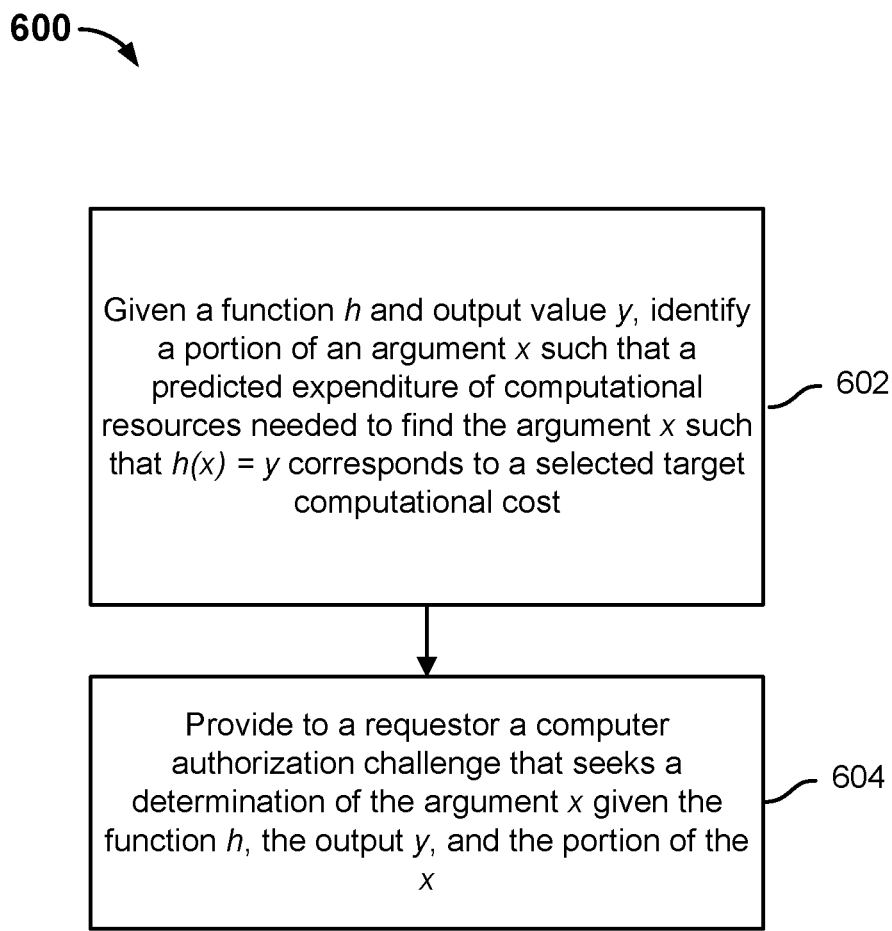
FIG. 6 is a flow diagram showing an example process for determining a computer authorization challenge to correspond to a selected target computational cost associated with a requested API.
Figures 7A, 7B:
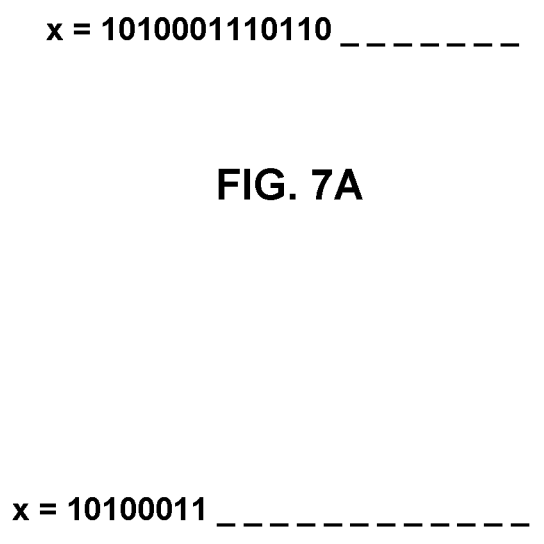

One example process by which to generate a computer authorization challenge such that a difficulty of completing the computer authorization challenge corresponds to the selected target computational cost is described with FIGS. 6, 7A, and 7B.

At 510, the generated computer authorization challenge is provided to the requestor. The generated computer authorization challenge is sent back to the requestor.

FIG. 6 is a flow diagram showing an example process for determining a computer authorization challenge to correspond to a selected target computational cost associated with a requested API. In some embodiments, process 600 may be implemented on a system such as system 300 of FIG. 3. Specifically, in some embodiments, process 600 may be implemented on a service server 308 of FIG. 3. In some embodiments, step 508 of process 500 of FIG. 5 may be part of process 600.

Process 600 describes one example process of determining a computer authorization challenge to correspond to a selected target computational cost associated with a requested API and other techniques may be used in practice as well.

At 602, given a function h and output value y, a portion of an argument x is identified such that a predicted expenditure of computational resources needed to find the argument x such that $h(x)=y$ corresponds to a selected target computational cost. In various embodiments, the function h is a collision resistant, hard to invert hash function (e.g., SHA-256). The output value y is a string of bits or characters that is output by the function h for a certain argument x. A portion of x (e.g., less than all the bits or characters of x) is determined such that in order to find the full argument x given the function h and the output value y such that $h(x)=y$, the responding device would need to exhaustively iterate and/or search through various combinations of characters or bits in addition to the given portion of x in order to find the full argument x. As such, the more characters or bits of x that are provided to the responding device, the less difficult and therefore fewer computational resources that will be expended to find the complete argument x. Similarly, the fewer characters or bits of x that are provided to the responding device, the more difficult and therefore the greater computational resources that will be expended to find the complete argument x. A portion of the argument x is determined such that the predicted computational resources needed to find the remaining portion of x, that is not provided to the requestor, is equal to or within a given tolerance of the selected target computational cost. For example, if the target computational cost is $10, then a portion of x is determined such that a cost to search for the remaining characters of x is equal to or within a given tolerance of $10.

In some implementations, the remaining characters of x are unique. In some implementations, the remaining characters of x are not unique, e.g., there is more than one solution for the remaining characters of x. A service server may determine whether the remaining characters of x received from the requesting device may evaluating the function h with the output value y and the argument x, some of which the requesting device generated.

At 604, a computer authorization challenge that seeks a determination of the argument x for the function h, the output value y, and the portion of argument x is provided to a requestor. Given the function h, the output value y, and only the portion of argument x, the requesting device needs to perform the work to solve for the remaining portion of the argument x. The requesting device may respond with the solved remaining portion of the argument x or the full argument x. The computer authorization challenge may include data that indicates whether the requesting device should provide a response with the solved remaining portion of the argument x or the full argument x.

FIGS. 7A and 7B show two examples of information provided with computer authorization challenges that are associated with different target computational costs. In the examples of FIGS. 7A and 7B, the computer authorization challenge seeks a determination of the entire argument x for a given function h (not shown), a given output value y (not shown), and a given portion of argument x. As described above with FIG. 6, the greater a portion of the argument x (e.g., the more characters or bits of the argument x) that is provided to a requesting client, the less difficult and less computationally expensive it is for the requesting client to solve for the full value of x. Similarly, the smaller a portion of the argument x (e.g., the fewer characters or bits of the argument x) that is provided to a API requesting client, the more difficult and more computationally expensive it is for the requesting client to solve for the full value of x. In the examples of FIGS. 7A and 7B, the full value of x is twenty bits.

In FIG. 7A, only the first thirteen bits of the twenty bits of x are provided to the requesting client (along with the function h, the output value y, and the relationship that $h(x)=y$), which indicates that the client must perform the work to compute the last seven bits of x as the response to the challenge. In FIG. 7B, only the first eight bits of the twenty bits of x are provided to the requesting client (along with the function h, the output value y, and the relationship that $h(x)=y$), which indicates that the client must perform the work to compute the last twelve bits of x as the response to the challenge. Comparing the computer authorization challenge associated with FIGS. 7A and 7B, the computer authorization challenge associated with FIG. 7A is relatively less difficult and less computationally expensive than the computer authorization challenge associated with FIG. 7B because the computer authorization challenge associated with FIG. 7B requires more bits of x to be searched for. Given that in the examples of FIGS. 7A and 7B, x is a string of bits, each additional bit of x that is not provided to the client may double the amount of searching and work that is to be performed by the client for a system working with base two bits or two different potential characters for each location in x. Therefore, the computer authorization challenge associated with FIG. 7B would be determined for a target computational cost that is higher than the target computational cost for which the computer authorization challenge associated with FIG. 7A would be determined.

Figure 8:
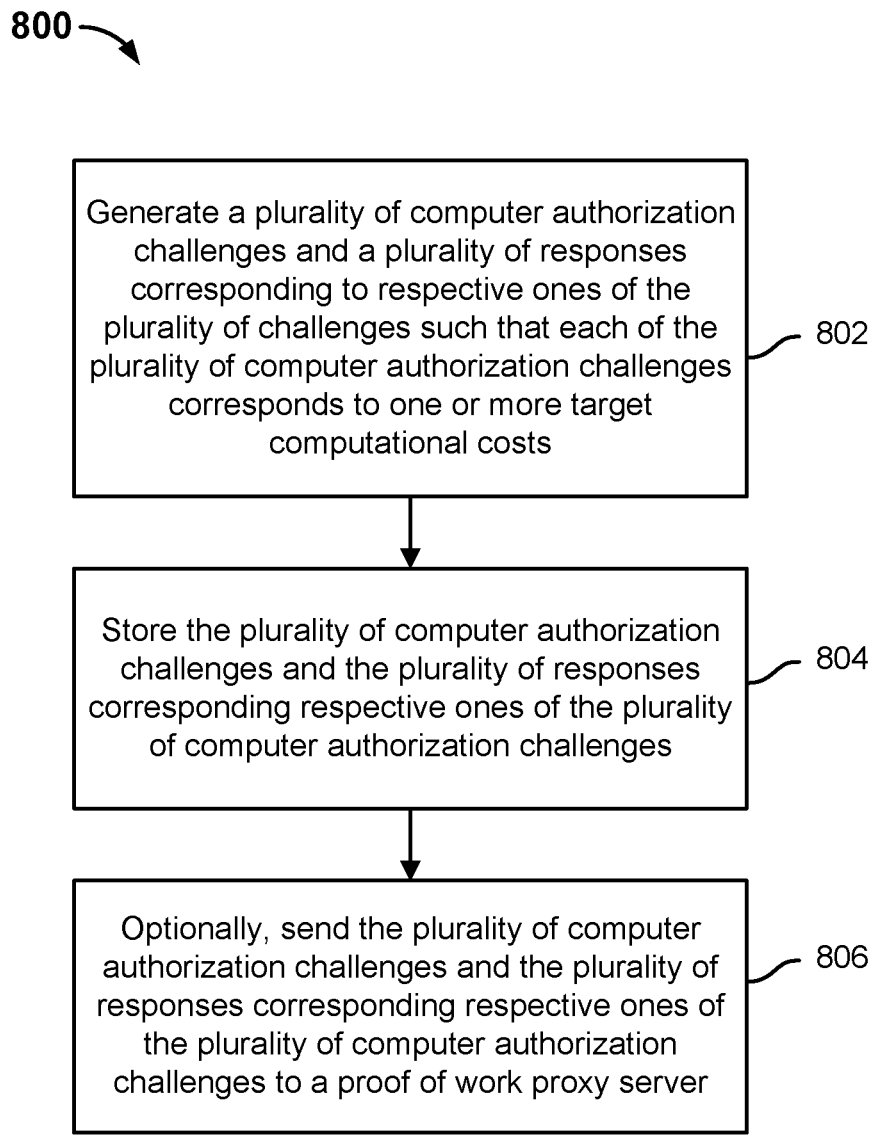
FIG. 8 is a flow diagram showing an embodiment of a process for generating multiple computer authorization challenges and responses.

FIG. 8 is a flow diagram showing an embodiment of a process for generating multiple computer authorization challenges and responses. In some embodiments, process 800 may be implemented on a system such as system 300 of FIG. 3. Specifically, in some embodiments, process 800 may be implemented on a service server 308 of FIG. 3.

Process 800 describes an example process in which the service server may generate a batch of computer authorization challenges and responses and then store them for later use in response to received API requests. In some embodiments, process 800 is implemented offline or prior to runtime (a time at which the service server becomes available to receive API requests) so that the service server can serve up, e.g., more efficiently, a previously generated computer authorization challenge in response to a received API request during runtime.

At 802, a plurality of computer authorization challenges and a plurality of responses corresponding to respective ones of the plurality of computer authorization challenges are generated. Each of the plurality of computer authorization challenges has a respective target computational cost. Computer authorization challenges and their respective responses are generated corresponding to one or more target computational costs.

At 804, the plurality of computer authorization challenges and the plurality of responses corresponding to respective ones of the plurality of computer authorization challenges are stored. In some embodiments, when a request for an API is subsequently received, the target computational cost that is selected for that API is determined. A stored computer authorization challenge corresponding to that target computational cost will be sent to that requestor. The computer authorization challenge that is retrieved may not have been previously issued to any requesting device, may not have been previously issued to the requesting device that submitted the API access request, or both.

At 806, optionally, the plurality of computer authorization challenges and the plurality of responses corresponding to respective ones of the plurality of computer authorization challenges are sent to a proof of work proxy server. In some embodiments, if a proof of work proxy server is configured to provide, e.g., sell, responses to the computer authorization challenges issued by the service server, then the service server may generate computer authorization challenges in bulk and then send the challenges and the responses to the proof of work proxy server periodically (e.g., once every twenty-four hours).

Figure 9:
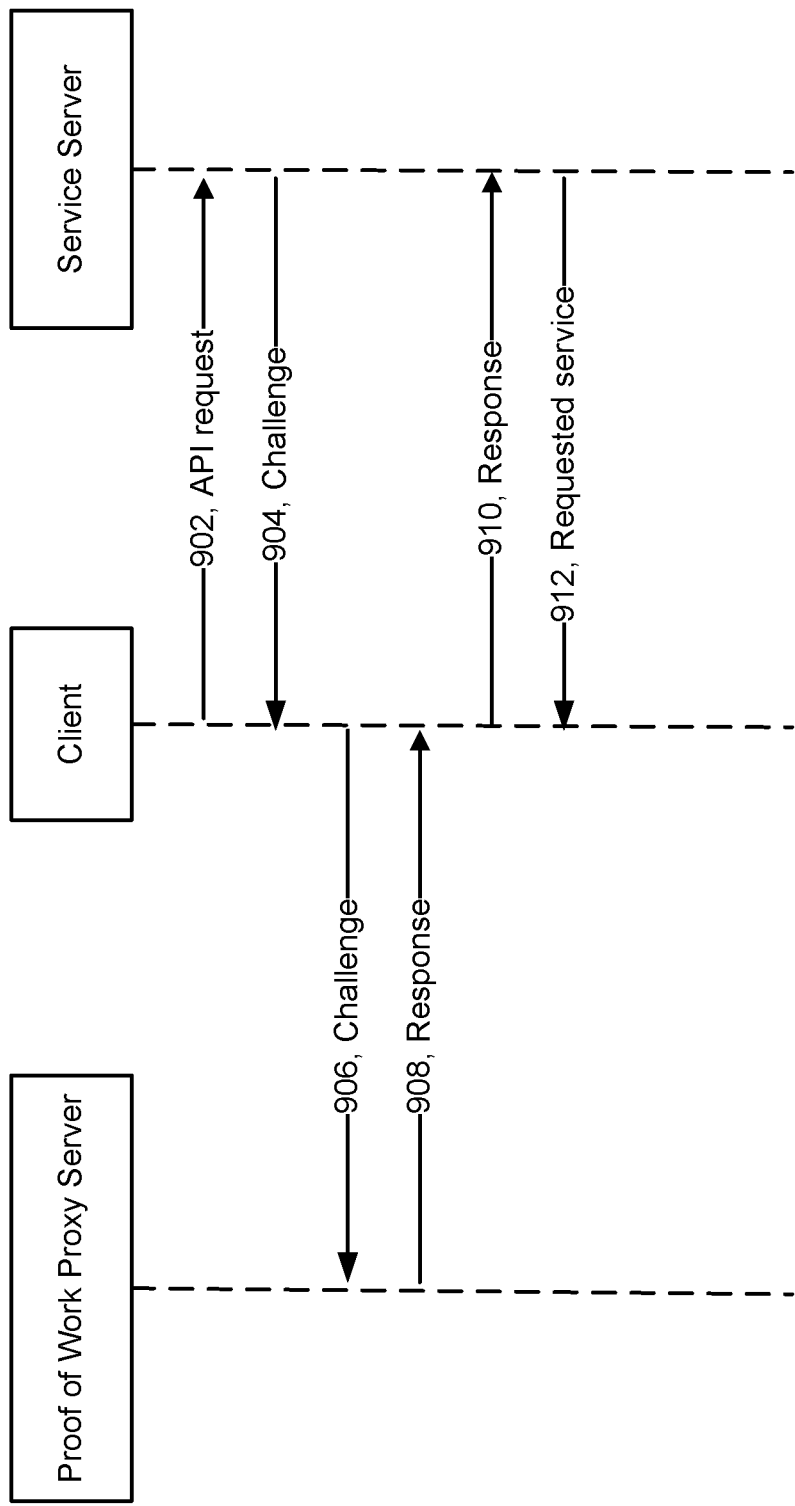
FIG. 9 is a flow diagram showing an example set of steps involved in a requestor initiating a response to a computer authorization challenge to be presented to a service server.

FIG. 9 is a flow diagram showing an example set of steps involved in a client initiating a response to a computer authorization challenge to be provided to a service server. In some embodiments, the client of FIG. 9 may be implemented using application 304 of system 300 of FIG. 3, e.g., on a requestor device. In some embodiments, the service server of FIG. 9 may be implemented using service server 308 of system 300 of FIG. 3. In some embodiments, the proof of work proxy server of FIG. 9 may be implemented using proof of work proxy server 312 of system 300 of FIG. 3.

At 902, an API request is sent from a client to a service server. The client may comprise an application executing at a device, such as a mobile device, for example. In various embodiments, the service server is part of an API service platform that is configured to service requests for API services.

At 904, in response to receiving the API request, a computer authorization challenge is sent from the service server to the client. In order to prevent malicious attackers from gaining access to the API and/or to monetize access to the API service, service server is configured send a proof of work-based computer authorization challenge to the client. If a correct response to the computer authorization challenge is not received from the client within a predetermined period of time, the service server is configured to deny service of the API request.

At 906, the computer authorization challenge may be forwarded from the client to a proof of work proxy server. For example, if the requesting device on which the client is executing lacks the processing power and/or computer resources needed to produce the response to the proof of work-based computer authorization challenge and/or if a setting for the requesting device indicates that the requesting device should not produce the response to the proof of work-based computer authorization challenge (e.g., because doing so would tie up most of the computer resources of the device for an undesirably long time), the requesting device can forward the computer authorization challenge to the proof of work proxy server. In some examples, the setting for the requesting device may be set in response to user selection, at a user interface that is presented by the requesting device, of a setting to cause the requesting device to forward the computer authorization challenge to a proof of work proxy server.

In some implementations, the service server may use data from the API request or data for the requesting device to determine to send the computer authorization challenge to the proof of work proxy server on behalf of the requesting device. In some implementations, the service server may use data from the API request or data for the requesting device to automatically authorize the API request for the requesting device, e.g., and charge the requesting device accordingly.

At 908, a response to the computer authorization challenge is sent from the proof of work proxy server to the client. In some embodiments, the proof of work proxy server may dynamically generate the response to the computer authorization challenge. In some embodiments, the proof of work proxy server may look up a previously generated or stored response to the computer authorization challenge received from the client, e.g., using data for a function h, output value y, and the portion of the argument x. In various embodiments, in addition to the computer authorization challenge, the client may send an indication to pay the proof of work proxy server an amount of money that is associated with purchasing the response to the computer authorization challenge. For example, in some embodiments, an identifier the amount of money that is needed to purchase the response to the computer authorization challenge from the proof of work proxy server is included in the computer authorization challenge sent from the service server. In some embodiments, the proof of work proxy server stores data indicating for which computer authorization challenges it had sold responses.

At 910, the response is sent from the client to the service server.

At 912, a service associated with the API request is performed by the service server. After the service server verifies that the response is correct for the issued computer authorization challenge (e.g., by comparing the response to a stored response or by inputting the response into the function associated with the computer authorization challenge), the service server proceeds to service the API request or forwards the API request to another server for servicing. For example, servicing the API request may include sending requested data, responsive to the API request, back to the client.

Figure 10:
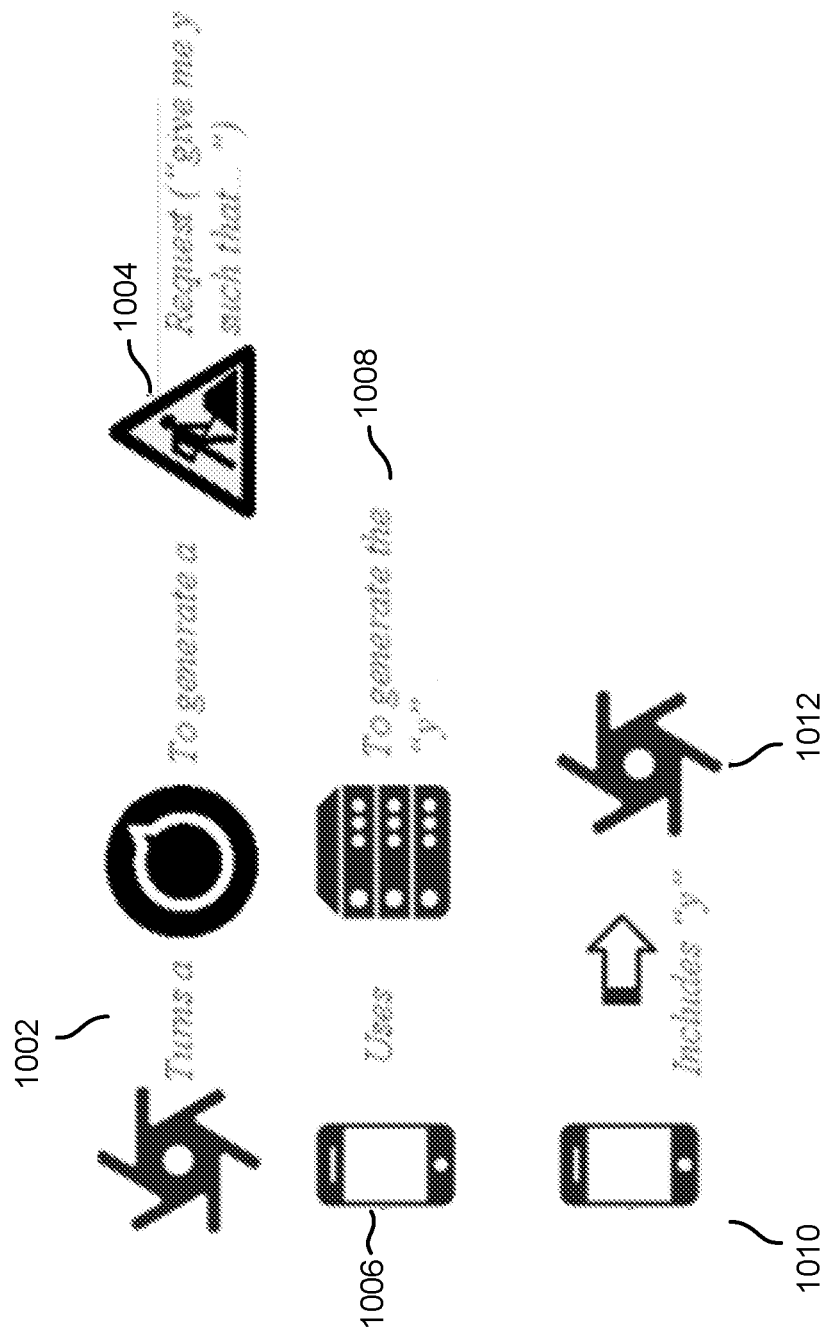
FIG. 10 shows a diagram illustrating another example set of steps involved in a requestor initiating a response to a computer authorization challenge to be presented to a service server.

FIG. 10 shows a diagram illustrating another example set of steps involved in a client initiating a response to a computer authorization challenge to be provided to a service server. As shown in the example, in 1002, an API platform (the challenger) implemented at least in part by a service server, in some embodiments, can customize (which is shown as tuning a knob) the difficulty of a proof of work-based computer authorization challenge based on the API to which a request relates, e.g., and the target computational cost for that API. In 1002, the API platform (the challenger) can then send the proof of work-based computer authorization challenge to the requesting device (the responder) on which a client is executing. In 1006, the requesting device contacts a proof of work proxy server (e.g., a cloud service) with a request that the proof of work proxy server compute the response to the challenge.

In 1008, the proof of work proxy server computes the response to the challenge. In some embodiments, the proof of work proxy server has to exist and be "paid for" by someone. This is because the work done by the proxy server on behalf of the requesting device consumes real resources (e.g., computational capacity, data center space, power utilization, etc.).

There are various possibilities to how this cost burden is met, depending on the form the business relationship takes between the owner of the API service requiring the proof of work (the challenger), the owner of the device from which the API request originates, and the owner or writer of the application which is running on the requesting device, and which actually makes the API request.

In 1010, the requesting device attaches the proof of work response to the API request and sends the proof of work response and the API request to the API platform (the challenger). In 1012, the API platform (the challenger) verifies that the proof of work response is correct before responding to the API request.

Figure 11:
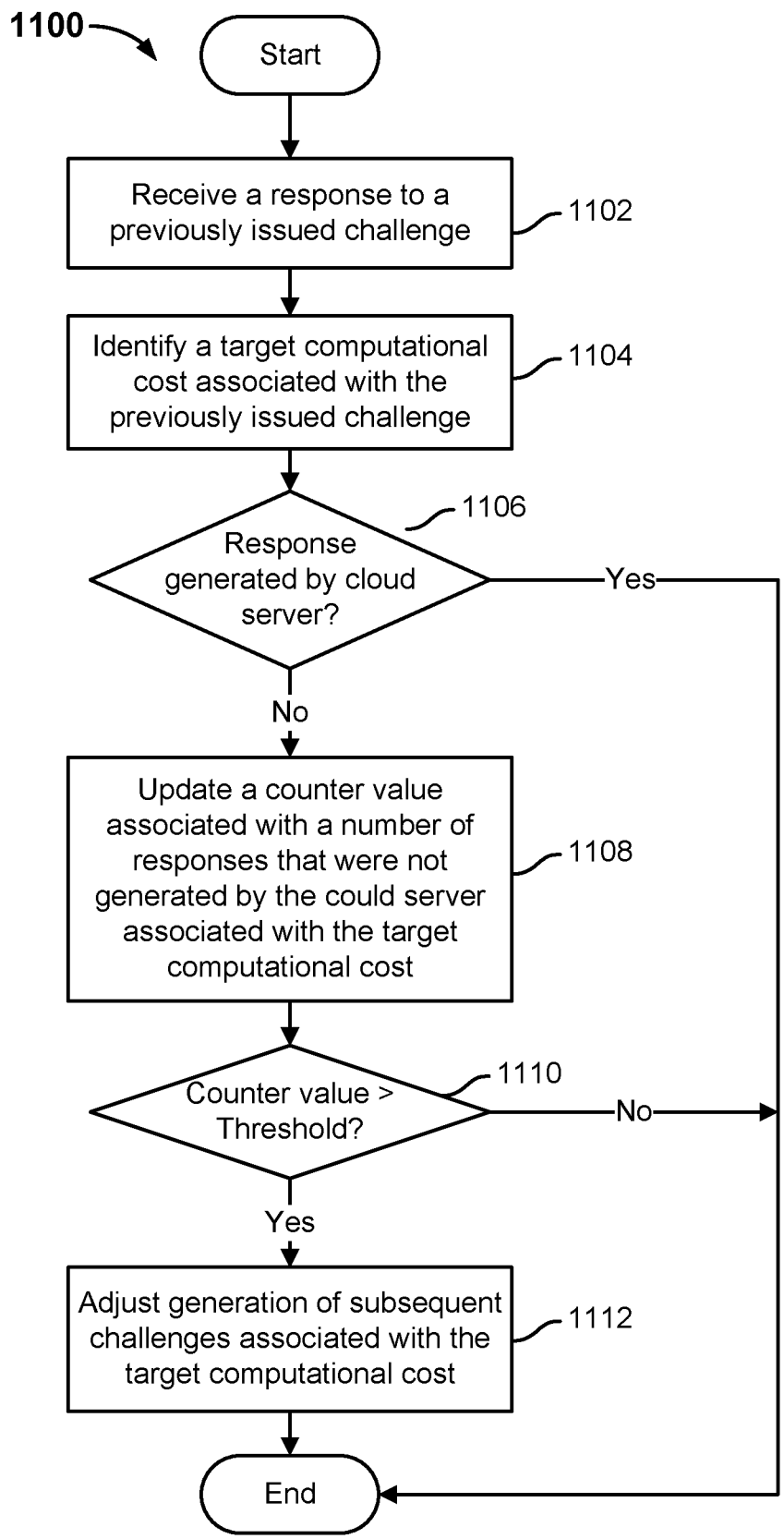
FIG. 11 is a flow diagram showing an embodiment of a process for receiving feedback on issued computer authorization challenges.

FIG. 11 is a flow diagram showing an embodiment of a process for receiving feedback on issued computer authorization challenges. The feedback may be used to adjust a target computational cost. In some embodiments, process 1100 may be implemented on a system such as system 300 of FIG. 3. Specifically, in some embodiments, process 1100 may be implemented on a service server 308 of FIG. 3.

Process 1100 is an example process that tracks whether a response to a computer authorization challenge is generated by a cloud server (e.g., a proof of work proxy server) or not. A response to a computer authorization challenge that is not generated by the cloud server indicates that the responder device had mostly likely computed the response on its own. When at least a threshold number of responses that are received have not been generated by the cloud server for challenges associated with a particular target computational cost, the difficulty of subsequent computer authorization challenges that are generated for that target computational cost may be increased so as to incentivize more users to request challenge responses from the cloud server rather than have a requesting device compute them.

At 1102, a response to a previously issued computer authorization challenge is received.

At 1104, a target computational cost associated with the previously issued computer authorization challenge is identified. In some embodiments, the target computational cost associated with the previously issued computer authorization challenge may be determined by looking up a stored correspondence between the challenge and its respective target computational cost.

At 1106, it is determined whether the response was generated by the cloud server. In the event that the response to the previously issued computation authorization challenge is generated by the cloud server, process 1100 ends. Otherwise, in the event that the response to the previously issued computation authorization challenge is not generated by the cloud server, control is transferred to 1108. In some embodiments, whether the response was generated by the cloud server (e.g., purchased from a proof of work proxy server) may be determined based on an indication sent from the proof of work proxy server that indicates that the response was generated by the proof of work proxy server. If no such indication is sent from the proof of work proxy server that indicates that the response was generated by the proof of work proxy server, then it is presumed that the response was generated by the requesting device.

At 1108, a counter value associated with a number of responses associated with the target computational cost that were not generated by the cloud server is updated. The counter value that tracks the number of responses associated with the target computational cost that have not been generated by the cloud server is incremented by one.

At 1110, it is determined whether the counter value exceeds a predetermined threshold value. In the event that the counter value exceeds the predetermined threshold value, control is transferred to 1112. Otherwise, in the event that the counter value does not exceed the predetermined threshold value, process 1100 ends.

At 1112, generation of subsequent computer authorization challenges associated with the target computational cost is adjusted. Due to the counter value that tracks the number of responses associated with the target computational cost that have not been generated by the cloud server exceeding the threshold value, the difficulty of subsequent computer authorization challenges that are generated for that target computational cost may be increased (e.g., so as to incentivize users to purchase more responses to computer authorization challenges associated with this target computational cost rather than compute the response on their own requesting devices). Using the type of computer authorization challenge that is described with FIGS. 6, 7A, and 7B, increasing the difficulty of subsequent computer authorization challenges may include providing fewer bits of the argument x to the requesting device so that more work would need to be performed in order to produce the correct response.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 12:
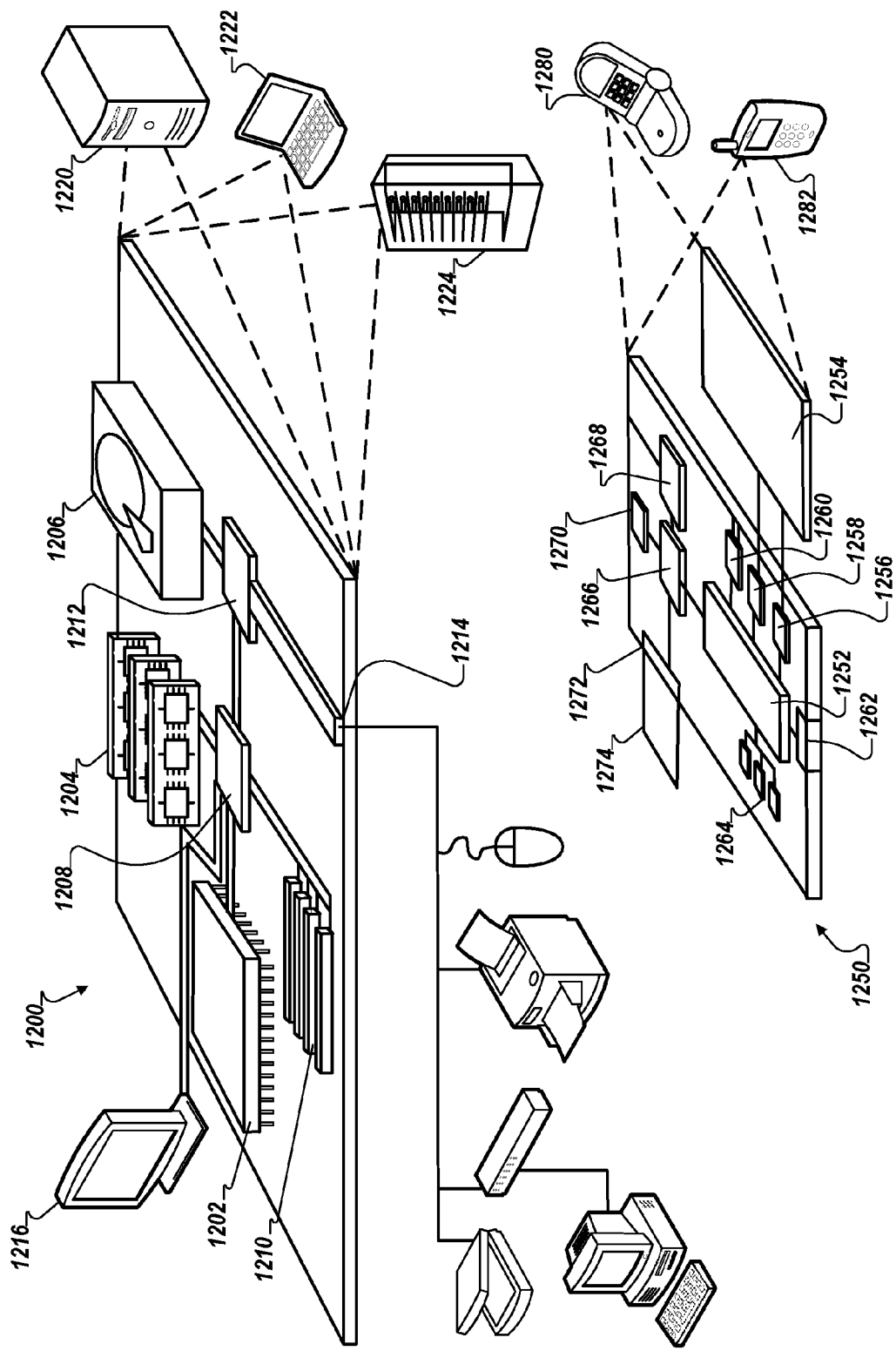
FIG. 12 is a block diagram of a computing system that can be used in connection with computer-implemented methods described in this document.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of duties is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can process instructions for execution within the computing device 1250, including instructions stored in the memory 1264. The processor may also include separate analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Embodiment 1 is a method comprising: receiving a request from a client for a computer authorization challenge to access an application programming interface; determining a computer authorization challenge with a difficulty of completion that satisfies a target computational cost for the application programming interface; and providing the computer authorization challenge to the client for access to the application programming interface.

Embodiment 2 is the method of embodiment 1, wherein: determining, by a computer authorization challenge system that includes one or more computers, the computer authorization challenge with a difficulty of completion that satisfies the target computational cost for the application programming interface comprises determining the computer authorization challenge with a computer resource expenditure difficulty of completion that satisfies the target computational cost of computer resources for an iterative search of a response to the computer authorization challenge for the application programming interface Embodiment 3 is the method of any of embodiments 1 through 2, further comprising: generating, by the computer authorization challenge system, a plurality of computer authorization challenges and a plurality of responses corresponding to respective ones of the plurality of computer authorization challenges, wherein each of the plurality of computer authorization challenges corresponds to one or more target computational costs that each comprise a cost associated with an expenditure of computer resources; storing, by the computer authorization challenge system in a database, the plurality of computer authorization challenges and the plurality of responses corresponding respective ones of the plurality of computer authorization challenges; and sending, by the computer authorization challenge system to a proof of work proxy server, the plurality of computer authorization challenges and the plurality of responses corresponding respective ones of the plurality of computer authorization challenges.

Embodiment 4 is the method of any of embodiments 1 through 3, further comprising: receiving a response to the computer authorization challenge from the client; determining that the response was not generated by a proof of work proxy server; in response to the determination that the response was not generated by the proof of work proxy server, updating a counter value associated with a number of responses that were not generated by a proof of work proxy server for the application programming interface; determining that the counter value satisfies a threshold value; and in response to the determination that the counter value satisfies the threshold value, adjusting a generation of subsequent challenges associated with the application programming interface.

Embodiment 5 is the method of embodiment 4, wherein: determining that the response was not generated by the proof of work proxy server comprises: receiving from a proof of work proxy server a plurality of indications associated with computer authorization challenges for which the proof of work proxy server generated responses; and determining that the computer authorization challenge is not included in the plurality of indications.

Embodiment 6 is the method of any of embodiments 1 through 5, wherein: determining that the response was not generated by the proof of work proxy server comprises: receiving from a proof of work proxy server a plurality of indications associated with computer authorization challenges for which the proof of work proxy server generated responses; and determining that the computer authorization challenge is not included in the plurality of indications.

Embodiment 7 is the method of any of embodiments 1 through 6, further comprising: for two or more computer authorization challenges sent to respective clients: receiving a response to the computer authorization challenge from the respective client; and determining whether the received response matches a generated response for the computer authorization challenge; for at least a first computer authorization challenge from the two or more computer authorization challenges: determining that the received response matches the generated response; and allowing the request to be serviced; and for at least a second computer authorization challenge from the two or more computer authorization challenges that is different than the first computer authorization challenge: determining that the received response does not match the generated response; and preventing the request from being serviced.

Embodiment 8 is the method of embodiment 7, wherein: allowing the request to be serviced comprises forwarding the request to another system for servicing.

Embodiment 9 is the method of embodiment 7, wherein: allowing the request to be serviced comprises servicing the request.

Embodiment 10 is the method of any of embodiments 1 through 9, further comprising: receiving an identifier of a cost boundary associated with the application programming interface; and selecting a target computational cost based at least in part on the cost boundary.

Embodiment 11 is the method of embodiment 10, wherein: receiving an identifier of a cost boundary associated with the application programming interface comprises receiving the identifier of the cost boundary via a user interface.

Embodiment 12 is the method of embodiment 10, wherein: the target computational cost satisfies a cost boundary for the application programming interface.

Embodiment 13 is the method of any of embodiments 1 through 12, wherein: the target computational cost comprises a cost associated with an expenditure of computer resources.

Embodiment 14 is the method of any of embodiments 1 through 13, wherein: determining the computer authorization challenge with a difficulty of completion that satisfies the target computational cost for the application programming interface comprises: given a function h and output value y, identifying a first portion of an argument x such that a predicted expenditure of computational resources needed to find a second portion of the argument x such that $h(x)=y$ corresponds to the target computational cost, wherein the first portion and the second portion of the argument x together define an entire argument x and the first portion is a mutually exclusive portion of the argument x from the second portion; and generating the computer authorization challenge that seeks a determination of the argument x given the function h, at least a portion of the output value y, and the first portion of argument x.

Embodiment 15 is the method of embodiment 14, wherein: generating the computer authorization challenge that seeks a determination of the argument x given the function h, at least a portion of the output value y, and the first portion of argument x comprises generating the computer authorization challenge that seeks a determination of the argument x given the function h, an entire output value y, and the first portion of argument x.

Embodiment 16 is the method of any of embodiments 1 through 15, wherein: the difficulty of completion for the computer authorization challenge comprises a degree of expenditure of computer resources for an iterative search of a response to the computer authorization challenge.

Embodiment 17 is the method of any of embodiments 1 through 16, further comprising: generating a plurality of computer authorization challenges and a plurality of responses corresponding to respective ones of the plurality of computer authorization challenges, wherein the plurality of computer authorization challenges corresponds to one or more target computational costs; storing the plurality of computer authorization challenges and the plurality of responses corresponding respective ones of the plurality of computer authorization challenges; and sending the plurality of computer authorization challenges and the plurality of responses corresponding respective ones of the plurality of computer authorization challenges to a proof of work proxy server.

Embodiment 18 is a system comprising: one or more computers and one or more storage devices storing instructions that are operable, when executed by the one or more computers, to cause the one or more computers to perform operations of any of embodiments 1 through 17.

Embodiment 19 is a computer storage medium encoded with a computer program, the program comprising instructions that are operable, when executed by data processing apparatus, to cause the data processing apparatus to perform operations of any of embodiments 1 through 17.

Embodiment 20 is a method comprising: providing, to a server, a request to access an application programming interface; receiving, in response to the request, a computer authorization challenge; determining a response for the computer authorization challenge; providing, to the server, the response to the computer authorization challenge for validation by the server; and in response to providing the response to the computer authorization challenge, receiving access to the application programming interface.

Embodiment 21 is the method of embodiment 20, wherein: providing, to the server, the request to access an application programming interface comprises providing the request for a function call for the application programming interface; and receiving access to the application programming interface comprises receiving data responsive to the function call.

Embodiment 22 is the method of embodiment 21, further comprising: using the received data to generate a user interface.

Embodiment 23 is the method of embodiment 22, wherein: using the received data to generate the user interface comprises using the received data to generate the user interface in a web browser.

Embodiment 24 is the method of embodiment 22, wherein: using the received data to generate the user interface comprises using the received data to generate the user interface for an application.

Embodiment 25 is the method of any of embodiments 20 through 24, wherein: determining the response for the computer authorization challenge comprises generating, using resources included in the one or more computers and the computer authorization challenge, the response for the computer authorization challenge.

Embodiment 26 is the method of embodiment 25, wherein: generating, using resources included in the one or more computers and the computer authorization challenge, the response for the computer authorization challenge comprises: determining that a setting indicates that the one or more computers should generate the response; and in response to determining that the setting indicates that the one or more computers should generate the response, generating, using resources included in the one or more computers and the computer authorization challenge, the response for the computer authorization challenge.

Embodiment 27 is the method of any of embodiments 20 through 26, wherein: determining the response for the computer authorization challenge comprises: providing, to a second server, the computer authorization challenge; and receiving, from the second server, the response for the computer authorization challenge.

Embodiment 28 is the method of embodiment 27, wherein: providing, to the second server, the computer authorization challenge comprises: determining that a setting indicates that the one or more computers should not generate the response; and in response to determining that the setting indicates that the one or more computers should not generate the response, providing, to the second server, the computer authorization challenge.

Embodiment 29 is a system comprising: one or more computers and one or more storage devices storing instructions that are operable, when executed by the one or more computers, to cause the one or more computers to perform operations of any of embodiments 20 through 28.

Embodiment 30 is a computer storage medium encoded with a computer program, the program comprising instructions that are operable, when executed by data processing apparatus, to cause the data processing apparatus to perform operations of any of embodiments 20 through 28.

Embodiment 31 is a method comprising: any combination of steps of any of embodiments 1 through 17 and 20 through 28.

Embodiment 32 is a system comprising: one or more computers and one or more storage devices storing instructions that are operable, when executed by the one or more computers, to cause the one or more computers to perform any combination of operations of any of embodiments 1 through 17 and 20 through 28.

Embodiment 33 is a computer storage medium encoded with a computer program, the program comprising instructions that are operable, when executed by data processing apparatus, to cause the data processing apparatus to perform any combination of operations of any of embodiments 1 through 17 and 20 through 28.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
   receiving a request from a client for a computer authorization challenge to access an application programming interface;
   determining whether a previously received response to a previously provided computer authorization challenge to access the application programming interface was generated by a proof of work proxy server instead of generated by the client;
   determining a target computational cost for the application programming interface based on the determination that the previously received response to the previously provided computer authorization challenge to access the application programming interface was generated by a proof of work proxy server instead of generated by the client;
   determining a computer authorization challenge with a difficulty of completion that satisfies the target computational cost for the application programming interface; and
   providing the computer authorization challenge to the client for access to the application programming interface.

2. The method of claim 1, wherein:
   determining, by a computer authorization challenge system that includes one or more computers, the computer authorization challenge with a difficulty of completion that satisfies the target computational cost for the application programming interface comprises determining the computer authorization challenge with a computer resource expenditure difficulty of completion that satisfies the target computational cost of computer resources for an iterative search of a response to the computer authorization challenge for the application programming interface, the method further comprising:
   generating, by the computer authorization challenge system, a plurality of computer authorization challenges and a plurality of responses corresponding to respective ones of the plurality of computer authorization challenges, wherein each of the plurality of computer authorization challenges corresponds to one or more target computational costs that each comprise a cost associated with an expenditure of computer resources;

storing, by the computer authorization challenge system in a database, the plurality of computer authorization challenges and the plurality of responses corresponding respective ones of the plurality of computer authorization challenges; and sending, by the computer authorization challenge system to the proof of work proxy server, the plurality of computer authorization challenges and the plurality of responses corresponding respective ones of the plurality of computer authorization challenges.

3. The method of claim 2, wherein determining a target computational cost for the application programming interface based on the determination that the previously received response to the previously provided computer authorization challenge to access the application programming interface was generated by a proof of work proxy server instead of generated by the client comprises:

in response to determining that the previously received response to the previously provided computer authorization challenge to access the application programming interface was generated by the client instead of generated by the proof of work proxy server, updating a counter value associated with a number of responses that were not generated by the proof of work proxy server for the application programming interface;

determining that the counter value satisfies a threshold value; and in response to the determination that the counter value satisfies the threshold value, adjusting a generation of subsequent challenges associated with the application programming interface.

4. The method of claim 1, wherein determining whether a previously received response to a previously provided computer authorization challenge to access the application programming interface was generated by a proof of work proxy server instead of generated by the client comprises:

receiving from the proof of work proxy server a plurality of indications associated with computer authorization challenges for which the proof of work proxy server generated responses; and determining that the computer authorization challenge is not included in the plurality of indications.

5. The method of claim 4, further comprising:

for two or more computer authorization challenges sent to respective clients:
  receiving a response to the computer authorization challenge from the respective client; and
  determining whether the received response matches a generated response for the computer authorization challenge;

for at least a first computer authorization challenge from the two or more computer authorization challenges:
  determining that the received response matches the generated response; and
  allowing the request to be serviced; and for at least a second computer authorization challenge from the two or more computer authorization challenges that is different than the first computer authorization challenge:
  determining that the received response does not match the generated response; and
  preventing the request from being serviced.

6. The method of claim 1, further comprising:
receiving an identifier of a cost boundary associated with the application programming interface; and
selecting a target computational cost based at least in part on the cost boundary.

7. The method of claim 6, wherein receiving an identifier of a cost boundary associated with the application programming interface comprises receiving the identifier of the cost boundary via a user interface.

8. The method of claim 6, wherein the target computational cost satisfies a cost boundary for the application programming interface.

9. The method of claim 1, wherein the target computational cost comprises a cost associated with an expenditure of computer resources.

10. The method of claim 1, wherein determining the computer authorization challenge with a difficulty of completion that satisfies the target computational cost for the application programming interface comprises:

given a function h and output value y, identifying a first portion of an argument x such that a predicted expenditure of computational resources needed to find a second portion of the argument x such that $h(x)=y$ corresponds to the target computational cost, wherein the first portion and the second portion of the argument x together define an entire argument x and the first portion is a mutually exclusive portion of the argument x from the second portion; and generating the computer authorization challenge that seeks a determination of the argument x given the function h, at least a portion of the output value y, and the first portion of argument x.

11. The method of claim 10, wherein generating the computer authorization challenge that seeks a determination of the argument x given the function h, at least a portion of the output value y, and the first portion of argument x comprises generating the computer authorization challenge that seeks a determination of the argument x given the function h, an entire output value y, and the first portion of argument x.

12. The method of claim 1, wherein the difficulty of completion for the computer authorization challenge comprises a degree of expenditure of computer resources for an iterative search of a response to the computer authorization challenge.

13. The method of claim 1, further comprising:
generating a plurality of computer authorization challenges and a plurality of responses corresponding to respective ones of the plurality of computer authorization challenges, wherein the plurality of computer authorization challenges corresponds to one or more target computational costs;

storing the plurality of computer authorization challenges and the plurality of responses corresponding respective ones of the plurality of computer authorization challenges; and sending the plurality of computer authorization challenges and the plurality of responses corresponding respective ones of the plurality of computer authorization challenges to a proof of work proxy server.

14. The method of claim 1, further comprising:
for two or more computer authorization challenges sent to respective clients:
  receiving a response to the computer authorization challenge from the respective client; and
  determining whether the received response matches a generated response for the computer authorization challenge;

for at least a first computer authorization challenge from the two or more computer authorization challenges:
  determining that the received response matches the generated response; and allowing the request to be serviced; and for at least a second computer authorization challenge from the two or more computer authorization challenges that is different than the first computer authorization challenge:

determining that the received response does not match the generated response; and preventing the request from being serviced.

15. The method of claim 1, comprising:

determining the target computational cost for the application programming interface based on a frequency that malicious requests to access the application programming interface are received.

16. A system comprising:

one or more computers and one or more storage devices storing instructions that are operable, when executed by the one or more computers, to cause the one or more computers to perform operations comprising:

receiving a request from a client for a computer authorization challenge to access an application programming interface;

determining whether a previously received response to a previously provided computer authorization challenge to access the application programming interface was generated by a proof of work proxy server instead of generated by the client;

determining a target computational cost for the application programming interface based on the determination that the previously received response to the previously provided computer authorization challenge to access the application programming interface was generated by a proof of work proxy server instead of generated by the client;

determining a computer authorization challenge with a difficulty of completion that satisfies the target computational cost for the application programming interface; and providing the computer authorization challenge to the client for access to the application programming interface.

17. The system of claim 16, wherein:

determining, by a computer authorization challenge system that includes one or more computers, the computer authorization challenge with a difficulty of completion that satisfies the target computational cost for the application programming interface comprises determining the computer authorization challenge with a computer resource expenditure difficulty of completion that satisfies the target computational cost of computer resources for an iterative search of a response to the computer authorization challenge for the application programming interface, the operations further comprising:

generating, by the computer authorization challenge system, a plurality of computer authorization challenges and a plurality of responses corresponding to respective ones of the plurality of computer authorization challenges, wherein each of the plurality of computer authorization challenges corresponds to one or more target computational costs that each comprise a cost associated with an expenditure of computer resources;

storing, by the computer authorization challenge system in a database, the plurality of computer authorization challenges and the plurality of responses corresponding respective ones of the plurality of computer authorization challenges; and sending, by the computer authorization challenge system to the proof of work proxy server, the plurality of computer authorization challenges and the plurality of responses corresponding respective ones of the plurality of computer authorization challenges.

18. A non-transitory computer-readable medium storing software comprising instructions executable by one or more computers which, upon such execution, cause the one or more computers to perform operations comprising:

receiving a request from a client for a computer authorization challenge to access an application programming interface;

determining whether a previously received response to a previously provided computer authorization challenge to access the application programming interface was generated by a proof of work proxy server instead of generated by the client;

determining a target computational cost for the application programming interface based on the determination that the previously received response to the previously provided computer authorization challenge to access the application programming interface was generated by a proof of work proxy server instead of generated by the client;

determining a computer authorization challenge with a difficulty of completion that satisfies the target computational cost for the application programming interface; and providing the computer authorization challenge to the client for access to the application programming interface.

19. The method of claim 1, wherein determining a target computational cost for the application programming interface based on the determination that the previously received response to the previously provided computer authorization challenge to access the application programming interface was generated by a proof of work proxy server instead of generated by the client comprises:

in response to determining that the previously received response to the previously provided computer authorization challenge to access the application programming interface was generated by the client instead of generated by the proof of work proxy server, increasing the target computational cost from a prior target computational cost used to determine the previously provided computer authorization challenge.

20. The method of claim 1, wherein determining a target computational cost for the application programming interface based on the determination that the previously received response to the previously provided computer authorization challenge to access the application programming interface was generated by a proof of work proxy server instead of generated by the client comprises:

in response to determining that the previously received response to the previously provided computer authorization challenge to access the application programming interface was generated by the proof of work proxy server instead of generated by the client, maintaining the target computational cost from a prior target computational cost used to determine the previously provided computer authorization challenge.

* * * * *

UNITED STATES PATENT AND TRADEMARK OFFICE
CERTIFICATE OF CORRECTION

PATENT NO. : 10,462,138 B2  
APPLICATION NO. : 15/432458  
DATED : October 29, 2019  
INVENTOR(S) : Jhingran et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 198 days.

Signed and Sealed this
Eleventh Day of August, 2020

Andrei Iancu
*Director of the United States Patent and Trademark Office*